United States Patent
Ojo et al.

(10) Patent No.: US 12,093,322 B2
(45) Date of Patent: Sep. 17, 2024

(54) UTILIZING A GRAPH NEURAL NETWORK TO GENERATE VISUALIZATION AND ATTRIBUTE RECOMMENDATIONS

(71) Applicant: Adobe Inc., San Jose, CA (US)

(72) Inventors: Fayokemi Ojo, Baltimore, MD (US); Ryan Rossi, Santa Clara, CA (US); Jane Hoffswell, Seattle, WA (US); Shunan Guo, San Jose, CA (US); Fan Du, Milpitas, CA (US); Sungchul Kim, San Jose, CA (US); Chang Xiao, Sunnyvale, CA (US); Eunyee Koh, San Jose, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/654,933

(22) Filed: Mar. 15, 2022

(65) Prior Publication Data

US 2023/0297625 A1    Sep. 21, 2023

(51) Int. Cl.
  *G06F 16/904*  (2019.01)
  *G06N 3/02*  (2006.01)
(52) U.S. Cl.
  CPC .......... *G06F 16/904* (2019.01); *G06N 3/02* (2013.01)
(58) Field of Classification Search
  CPC ................................. G06F 16/904; G06N 3/02
  See application file for complete search history.

(56) References Cited

U.S. PATENT DOCUMENTS

2019/0304157 A1*  10/2019  Amer ................... G06V 40/23
2021/0256644 A1*   8/2021  Cahalane .......... G06Q 10/1053
(Continued)

OTHER PUBLICATIONS

Jasmijn Bastings, Ivan Titov, Wilker Aziz, Diego Marcheggiani, and Khalil Simaan. 2017. Graph Convolutional Encoders for Syntax-aware Neural Machine Translation. In Proceedings of the 2017 Conference on Empirical Methods in Natural Language Processing. Association for Computational Linguistics, Copenhagen, Denmark, 1957-1967. https://doi.org/10.18653/v1/D17-1209.
(Continued)

*Primary Examiner* — Amresh Singh
*Assistant Examiner* — Courtney Harmon
(74) *Attorney, Agent, or Firm* — Keller Preece PLLC

(57) ABSTRACT

The present disclosure relates to systems, methods, and non-transitory computer readable media that utilize a graph neural network to generate data recommendations. The disclosed systems generate a digital graph representation comprising user nodes corresponding to users, data attribute nodes corresponding to data attributes, and edges reflecting historical interactions between the users and the data attributes; Moreover, the disclosed systems generate, utilizing a graph neural network, user embeddings for the user nodes and data attribute embeddings for the data attribute nodes from the digital graph representation. In addition, the disclosed systems generate, utilizing a graph neural network, user embeddings for the user nodes and data attribute embeddings for the data attribute nodes from the digital graph representation. Furthermore, the disclosed systems determine a data recommendation for a target user utilizing the data attribute embeddings and a target user embedding corresponding to the target user from the user embeddings.

20 Claims, 13 Drawing Sheets

(56) References Cited

U.S. PATENT DOCUMENTS

| | | | | |
|---|---|---|---|---|
| 2022/0253722 | A1* | 8/2022 | Wu | G06Q 30/0631 |
| 2022/0277031 | A1* | 9/2022 | Quamar | G06F 16/90332 |
| 2022/0317985 | A1* | 10/2022 | Arseneault | G06F 8/36 |
| 2023/0027427 | A1* | 1/2023 | Ma | G06N 3/08 |
| 2023/0049817 | A1* | 2/2023 | Shi | G06F 18/211 |

OTHER PUBLICATIONS

Stephen M Casner. 1991. Task-Analytic Approach to the Automated Design of Graphic Presentations. ACM Transactions on Graphics (ToG) 10, 2 (1991), 111-151.

Zhe Cui, Sriram Karthik Badam, M Adil Yalçin, and Niklas Elmqvist. 2019. Datasite: Proactive Visual Data Exploration With Computation of Insight-Based Recommendations. Information Visualization 18, 2 (2019), 251-267.

Tuan Nhon Dang and Leland Wilkinson. 2014. ScagExplorer: Exploring Scatter-plots by Their Scagnostics. In 2014 IEEE Pacific visualization symposium. IEEE, 73-80.

Çağatay Demiralp, Peter J Haas, Srinivasan Parthasarathy, and Tejaswini Pedapati. 2017. Foresight: Recommending Visual Insights. In Proceedings of the VLDB Endowment International Conference on Very Large Data Bases, vol. 10.

Mark Derthick, John Kolojejchick, and Steven F Roth. 1997. An interactive visualization environment for data exploration. In KDD. 2-9.

Victor Dibia and Çağatay Demiralp. 2019. Data2vis: Automatic generation of data visualizations using sequence-to-sequence recurrent neural networks. IEEE computer graphics and applications 39, 5 (2019), 33-46.

Stef van den Elzen and Jarke J. van Wijk. 2013. Small Multiples, Large Singles: A New Approach for Visual Data Exploration. In Computer Graphics Forum, vol. 32. 191-200.

Wenqi Fan, Yao Ma, Qing Li, Yuan He, Eric Zhao, Jiliang Tang, and Dawei Yin. 2019. Graph neural networks for social recommendation. In The World Wide Web Conference. 417-426.

Steven Feiner. 1985. APEX: An Experiment in the Automated Creation of Pictorial Explanations. IEEE Computer Graphics and Applications 5, 11 (1985), 29-37.

Xiangnan He, Kuan Deng, Xiang Wang, Yan Li, Yongdong Zhang, and Meng Wang. 2020. Lightgcn: Simplifying and powering graph convolution network for recommendation. In Proceedings of the 43rd International ACM SIGIR conference on research and development in Information Retrieval. 639-648.

Xiangnan He, Hanwang Zhang, Min-Yen Kan, and Tat-Seng Chua. 2016. Fastmatrix factorization for online recommendation with implicit feedback. In Proceedings of the 39th International ACM SIGIR conference on Research and Development in Information Retrieval. 549-558.

Kevin Hu, Diana Orghian, and César Hidalgo. 2018. Dive: A mixed-initiative system supporting integrated data exploration workflows. In Workshop on Human In-the-Loop Data Anal. 1-7.

Alicia Key, Bill Howe, Daniel Perry, and Cecilia Aragon. 2012. VizDeck: Self-Organizing Dashboards for Visual Analytics. In Proceedings of the 2012 ACM SIGMOD International Conference on Management of Data. 681-684.

Doris Jung-Lin Lee. 2020. Insight Machines: The Past, Present, and Future of Visualization Recommendation.

Doris Jung-Lin Lee, Himel Dev, Huizi Hu, Hazem Elmeleegy, and Aditya Parameswaran. 2019. Avoiding Drill-Down Fallacies With VisPilot: Assisted Exploration of Data Subsets. In Proceedings of the 24th International Conference on Intelligent User Interfaces. 186-196.

Halden Lin, Dominik Moritz, and Jeffrey Heer. 2020. Dziban: Balancing Agency & Automation in Visualization Design via Anchored Recommendations. In Pro-ceedings of the 2020 CHI Conference on Human Factors in Computing Systems. 1-12.

Yuyu Luo, Xuedi Qin, Nan Tang, and Guoliang Li. 2018. DeepEye: towards automatic data visualization. In 2018 IEEE 34th International Conference on Data Engineering (ICDE). IEEE, 101-112.

Jock Mackinlay. 1986. Automating the design of graphical presentations of relational information. ACM Trans. Graph. 5, 2 (1986), 110-141.

Jock Mackinlay, Pat Hanrahan, and Chris Stolte. 2007. Show Me: Automatic presentation for visual analysis. TVCG 13, 6 (2007), 1137-1144.

Dominik Moritz, Chenglong Wang, Greg L Nelson, Halden Lin, Adam M Smith, Bill Howe, and Jeffrey Heer. 2018. Formalizing visualization design knowledge as constraints: Actionable and extensible models in draco. IEEE transactions on visualization and computer graphics 25, 1 (2018), 438-448.

Belgin Mutlu, Eduardo Veas, and Christoph Trattner. 2016. Vizrec: Recommending personalized visualizations. ACM Transactions on Interactive Intelligent Systems (TIIS) 6, 4 (2016), 1-39.

Daniel B Perry, Bill Howe, Alicia MF Key, and Cecilia Aragon. 2013. VizDeck: Streamlining exploratory visual analytics of scientific data. (2013).

Siyuan Qi, Wenguan Wang, Baoxiong Jia, Jianbing Shen, and Song-Chun Zhu. 2018. Learning Human-Object Interactions by Graph Parsing Neural Networks. arXiv:1808.07962 [cs.CV].

Xin Qian, Ryan A. Rossi, Fan Du, Sungchul Kim, Eunyee Koh, Sana Malik, Tak Yeon Lee, and Joel Chan. 2020. ML-based Visualization Recommendation: Learning to Recommend Visualizations from Data. arXiv:2009.12316 (2020).

Ryan A Rossi, Rong Zhou, and Nesreen K Ahmed. 2017. Deep feature learning for graphs. arXiv preprint arXiv:1704.08829 (2017).

Steven F Roth, John Kolojejchick, Joe Mattis, and Jade Goldstein. 1994. Interactive graphic design using automatic presentation knowledge. In CHI. 112-117.

Jinwook Seo and Ben Shneiderman. 2005. A Rank-by-Feature Framework for Interactive Exploration of Multidimensional Data. Information visualization 4, 2 (2005), 96-113.

Tarique Siddiqui, Albert Kim, John Lee, Karrie Karahalios, and Aditya Parameswaran. 2016. Effortless Data Exploration With zenvisage: An Expressive and Interactive Visual Analytics System. arXiv preprint arXiv:1604.03583 (2016).

Chris Stolte, Diane Tang, and Pat Hanrahan. 2002. Polaris: A system for query, analysis, and visualization of multidimensional relational databases. TVCG 8, 1 (2002), 52-65.

Rianne van den Berg, Thomas N. Kipf, and Max Welling. 2017. Graph Convolutional Matrix Completion. arXiv:1706.02263 [stat.ML].

Manasi Vartak, Silu Huang, Tarique Siddiqui, Samuel Madden, and Aditya Parameswaran. 2017. Towards visualization recommendation systems. SIGMOD 45, 4 (2017), 34-39.

Manasi Vartak, Sajjadur Rahman, Samuel Madden, Aditya Parameswaran, and Neoklis Polyzotis. 2015. Seedb: Efficient data-driven visualization recommendations to support visual analytics. In Proceedings of the VLDB Endowment International Conference on Very Large Data Bases, vol. 8. NIH Public Access, 2182.

Martin Voigt, Stefan Pietschmann, and Klaus Meißner. 2013. A semantics-based, end-user-centered information visualization process for semantic web data. In Semantic models for adaptive interactive systems. Springer, 83-107.

Xiang Wang, Xiangnan He, Yixin Cao, Meng Liu, and Tat-Seng Chua. 2019. Kgat: Knowledge graph attention network for recommendation. In Proceedings of the 25th ACM SIGKDD International Conference on Knowledge Discovery & Data Mining. 950-958.

Leland Wilkinson and Graham Wills. 2008. Scagnostics Distributions. Journal of Computational and Graphical Statistics 17, 2 (2008), 473-491.

Graham Wills and Leland Wilkinson. 2010. Autovis: automatic visualization. Information Visualization 9, 1 (2010), 47-69.

Kanit Wongsuphasawat, Dominik Moritz, Anushka Anand, Jock Mackinlay, Bill Howe, and Jeffrey Heer. 2016. Towards a General-Purpose Query Language for Visualization Recommendation. In Proceedings of the Workshop on Human-In-the-Loop Data Analytics. ACM, 4.

Kanit Wongsuphasawat, Dominik Moritz, Anushka Anand, Jock Mackinlay, Bill Howe, and Jeffrey Heer. 2016. Voyager: Explor-

(56) References Cited

OTHER PUBLICATIONS atory Analysis via Faceted Browsing of Visualization Recommendations. IEEE transactions on visualization and computergraphics22,1(2016),649-658.

Kanit Wongsuphasawat, Zening Qu, Dominik Moritz, Riley Chang, Felix Ouk, Anushka Anand, Jock Mackinlay, Bill Howe, and Jeffrey Heer. 2017. Voyager 2: Augmenting visual analysis with partial view specifications. In Proceedings of the 2017 CHI Conference on Human Factors in Computing Systems. 2648-2659.

Zonghan Wu, Shirui Pan, Fengwen Chen, Guodong Long, Chengqi Zhang, and S Yu Philip. 2020. A comprehensive survey on graph neural networks. IEEE transactions on neural networks and learning systems 32, 1 (2020), 4-24.

Keyulu Xu, Weihua Hu, Jure Leskovec, and Stefanie Jegelka. 2019. How Powerful are Graph Neural Networks? arXiv:1810.00826 [cs.LG].

Rex Ying, Ruining He, Kaifeng Chen, Pong Eksombatchai, William L Hamilton, and Jure Leskovec. 2018. Graph convolutional neural networks for web-scale recommender systems. In KDD. 974-983.

Jie Zhou, Ganqu Cui, Shengding Hu, Zhengyan Zhang, Cheng Yang, Zhiyuan Liu, Lifeng Wang, Changcheng Li, and Maosong Sun. 2020. Graph neural networks: A review of methods and applications. AI Open 1 (2020), 57-81.

\* cited by examiner

UTILIZING A GRAPH NEURAL NETWORK TO GENERATE VISUALIZATION AND ATTRIBUTE RECOMMENDATIONS

BACKGROUND

Recent years have seen significant advancements in computer-implemented models for managing large digital data volumes and generating corresponding digital visualizations. For instance, in the field of data repository management and implementation, engineers utilize distributed memory and processing devices to manage voluminous digital data repositories so that client devices can access and analyze the interplay between various data attributes across one or more datasets. In managing, storing, and processing digital data repositories, a sub task has also arisen in recommending pertinent data attributes and/or visualizations to client devices. To illustrate, because some digital data volumes can include millions upon millions of data attributes, computing devices can explore and suggest attributes and visualizations pertinent to particular client devices and corresponding users. Although there have been significant advancements in the field of attribute and visualization recommendations, a number of technical shortcomings still exist, particular with regard to flexibility, data sparsity, and accuracy of implementing computing devices.

SUMMARY

This disclosure describes one or more embodiments of systems, methods, and non-transitory computer readable media that solve one or more of the foregoing or other problems in the art by utilizing a graph neural network framework to generate digital data recommendations including data attribute and/or data visualization recommendations. In particular, in one or more embodiments, the disclosed systems formulate a digital graph representation of users and corresponding data attributes and/or data visualizations. For example, the disclosed systems generate a graph representing users, visual specifications from visualizations that users have utilized, data attributes utilized in those visualizations, and/or data attributes uses have specifically selected. Because each user can have access to a disjoint collection of datasets, in some embodiments the disclosed systems map each attribute to a shared meta-feature space to learn attributes that are statistically and semantically similar to attributes corresponding to the user. Moreover, in one or more implementations, the disclosed systems utilize a graph neural network to generate user-specific embeddings of attributes and/or visual configurations from the graph. From these user-specific embeddings, the disclosed systems predict data attributes and corresponding data visualizations to surface to a client device of a target user.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure describes one or more embodiments of the invention with additional specificity and detail by referencing the accompanying figures. The following paragraphs briefly describe those figures, in which.

DETAILED DESCRIPTION

Figure 1:
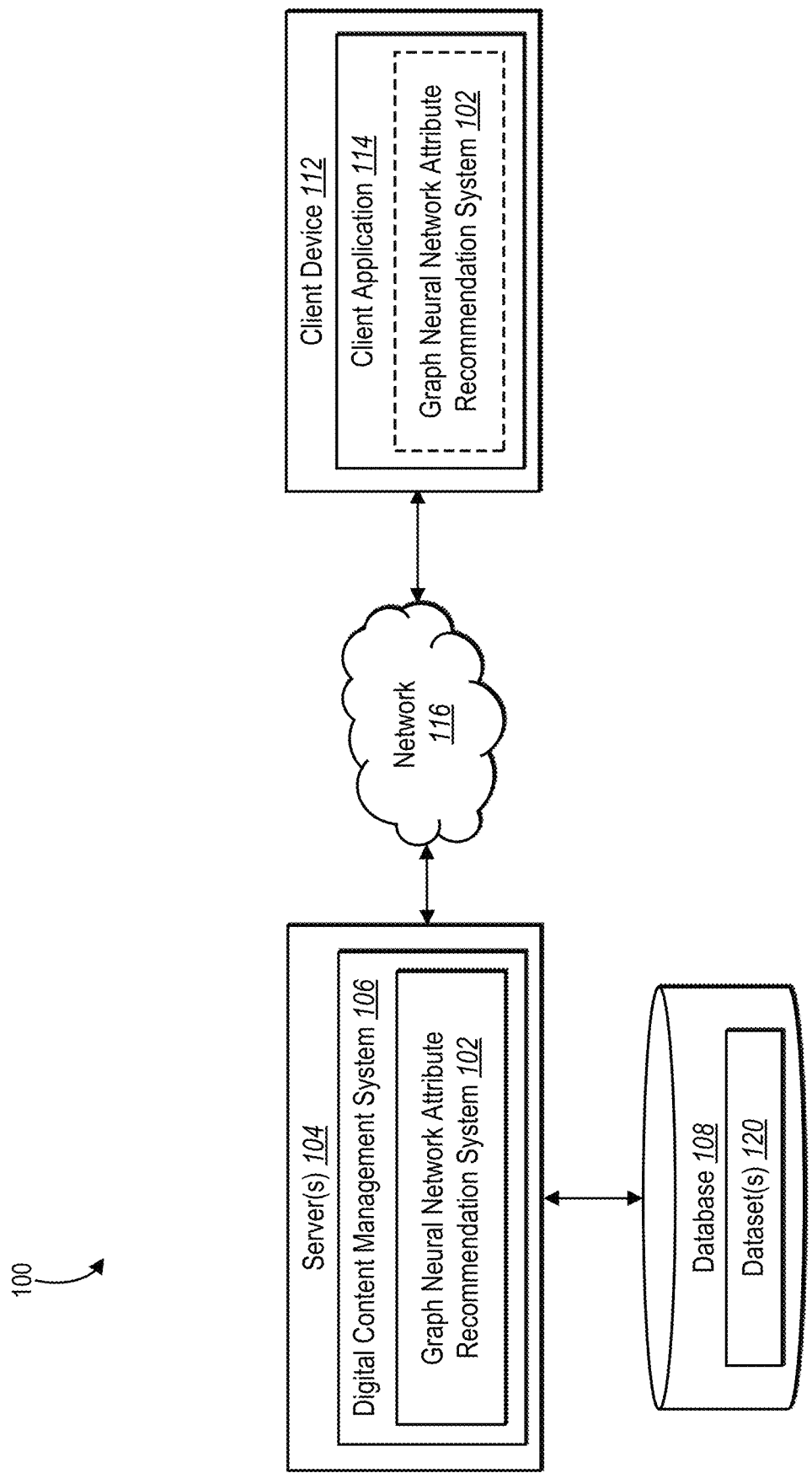
FIG. 1 illustrates an example system environment in which a graph neural network attribute recommendation system operates in accordance with one or more embodiments.

This disclosure describes one or more embodiments of a graph neural network attribute recommendation system ("GNN recommendation system") that utilizes a graph neural network to generate data recommendations such as data attribute and/or data visualization recommendations. Conventional systems suffer from a number of technical deficiencies with regard to flexibility, data sparsity, and accuracy. For example, many conventional systems for data attribute and/or visualization recommendations are rule-based, and are thus unable to recommend visualizations that are personalized to specific users based on previous visualizations that they preferred, liked, or generated. Such rigid, rule based approaches cannot flexibly adapt to the unique characteristics of particular users or accommodate modifications to data attributes, visualizations, and preferences that change over time.

Some conventional systems utilize machine learning approaches to generate recommendations. These approaches, however, do not model users but focus on learning or manually defining visualization rules that capture the notion of an effective visualization. Therefore, regardless of the user, these models rigidly provide the same recommendation. Moreover, for systems that do consider some user features, such systems inflexibly apply only to the circumstance where a single dataset is shared by all users. This rigid approach is unrealistic and inconsistent with common practice.

Some conventional systems utilize statistical approaches, such as collaborative filtering, to predict pertinent data attributes. These (and other) approaches, however, suffer from data sparsity and disjoint dataset problems. For example, there are often tens of thousands of datasets stored in a digital data repository, where each dataset is utilized by a single (or small group) of users. Because users often have their own datasets that are not shared by other users, traditional collaborative filtering approaches do not work in this setting. Indeed, generating recommendations for data attributes and/or visualizations is extremely challenging utilizing conventional systems due to the extreme sparsity of interactions per user, dataset, etc. and the complexity of applicable objects (e.g., visualizations include data from some data table and visualization design choices such as chart-type, marker, color, grid, size, and so on). Moreover, the space of visualizations for one dataset is often completely disjoint from the space of visualizations from another dataset.

The foregoing challenges undermine the accuracy and reliability of conventional systems. Indeed, conventional systems often generate inaccurate recommendations that fail to reflect the particular needs of individual users and client devices. Because large data volumes can include millions of data attributes and an intractable number of combinations for data visualizations, conventional systems inhibit accurate analysis and understanding of large digital data volumes.

In one or more embodiments, the GNN recommendation system utilizes a graph neural network to leverage both implicit and explicit feedback to automatically learn a personalized recommendation model for each user. To illustrate, the GNN recommendation system derives a series of graphs with nodes reflecting users, data attributes from various datasets, and/or visual configurations from a corpus of data visualizations. The GNN recommendation system encodes historical interactions between users, the data-attributes, and/or the visualizations as edges in the graph. The GNN recommendation system utilizes the graph neural network to iteratively aggregate information from neighboring nodes and generate node embeddings. Accordingly, the GNN recommendation system captures the non-linear interactions between users, data-attributes, and/or visual configurations, thereby improving the learned representations, making it possible to infer highly relevant data attributes and/or data visualizations personalized for specific target users.

As just mentioned, in one or more embodiments, the GNN recommendation system generates a digital graph representation of users, data attributes, and/or data visualizations. For example, the GNN recommendation system monitors interactions between users and data attributes, such as client devices accessing data visualizations portraying certain data attributes and user selection of particular data attributes. The GNN recommendation system generates a digital graph representation that includes user nodes representing users, data attribute nodes reflecting data attributes and/or visual configuration nodes reflecting visual configuration parameters of data visualizations. The GNN recommendation system generates edges between these nodes based on the monitored historical interactions between the users, data attributes, and/or data visualizations. For example, the GNN recommendation system generates an edge between a user node and a data attribute node based on a user accessing a data attribute and generates an edge between a data attribute node and visual configuration node based on a data attribute appearing in a data visualization that includes a particular set of visual configuration parameters.

Upon generating the digital graph representation, in one or more embodiments the GNN recommendation system utilizes a graph neural network to generate embeddings. For example, the GNN recommendation system iteratively aggregates information from neighborhood nodes utilizing learned parameters of the graph neural network to generate user embeddings, data attribute embeddings, and/or visual configuration embeddings. These embeddings reflect the complex, non-linear relationships between users, data attributes, and/or visual configurations.

In one or more embodiments, the GNN recommendation system utilizes these embeddings to derive a user-specific representation and generate a data recommendation (e.g., a recommendation of a data attribute and or data visualization for a target user). For example, the GNN recommendation system identifies a target user, a target data attribute, and/or a target visualization with a target set of visual configuration parameters. The GNN recommendation system combines a user embedding (corresponding to the target user), a data attribute embedding (corresponding to the target attribute), and/or a visual configuration embedding corresponding to the set of target visualization parameters. For example, the GNN recommendation system uses a non-linear function that maps these embeddings to a compatibility score (e.g., a continuous score or a positive/negative classification label) that indicates compatibility between the target user and the target data attribute/target data visualization.

In one or more embodiments, the GNN recommendation system utilizes compatibility scores to generate data recommendations. For example, the GNN recommendation system provides, for display via a user interface of a client device, a recommended data attribute that a user should consider in analyzing a digital dataset. Similarly, in some embodiments, the GNN recommendation system provides, for display, a recommended data visualization that portrays one or more data attributes according to one or more visual configuration parameters. Thus, in one or more implementations the GNN recommendation system generates a data recommendation comprising one or more attributes and/or one or more data visualizations specifically targeted to a particular user. Moreover, the GNN recommendation system can generate a variety of personalized data recommendations for a variety of different tasks such as (a) personalized design choice recommendations (e.g., chart-type or marker-type recommendation), (b) personalized attribute recommendation, (c) personalized visualization-configuration recommendation, and even (d) personalized recommendation of users with similar visual and data preferences or interests (e.g., for collaboration purposes). Indeed, the GNN recommendation system 102 can generate recommendations for identifying a significant data attribute in a large dataset, adding new data attributes or visualizations to a dashboard, performing queries (e.g., completing query language), suggesting additional datasets to expand an existing dataset, etc.

Embodiments of the GNN recommendation system can provide a variety of advantages over conventional systems, particularly with regard to flexibility, data sparsity, and accuracy. For example, by utilizing a graph neural network, the GNN recommendation system generates embeddings reflecting complex inter-relationships between users, data attributes, and/or visual configurations. Moreover, in one or more embodiments the GNN recommendation system utilizes a non-linear function to generate a user-specific representation for any particular data recommendation. For instance, the GNN recommendation system concatenates learned representations that pertain to a specific context (i.e., a target user embedding, target data attribute embedding, and/or target visual configuration embedding) and maps the user-specific representation to a particular compatibility prediction. In this manner, the GNN recommendation system can flexibly provide a variety of different recommendations (for data attributes, visualizations, users, etc.) specific to unique user characteristics and context.

Moreover, by continuing to monitor user interactions and update graphs and graph neural network parameters, in one or more implementations the GNN recommendation system flexibly adapts to changing conditions over time. Indeed, in one or more embodiments the GNN recommendation system incorporates a variety of complex explicit and implicit feedback signals that allow the GNN recommendation system to flexibly adapt to a variety of circumstances and contexts.

In addition to improving flexibility, the GNN recommendation system can also address data sparsity issues that plague conventional recommendation systems. In particular, by utilizing a graph neural network, the GNN recommendation system is able to overcome technical issues caused by disjoint datasets and the lack of overlap between data preferences. For example, the GNN recommendation system utilizes a graph neural network to generate embeddings that reflect complex interactions between uses, data attributes, and visual configurations. To illustrate, while user feedback on data attributes for a first dataset may not directly transfer to a second dataset, through the graph neural network, the GNN recommendation system leverages other features (e.g., similar visual configurations or other similar user features) to generate personalized digital recommendations.

Furthermore, the GNN recommendation system can also improve accuracy relative to conventional systems. For instance, as just discussed, utilizing a graph neural network assists in modeling complex interactions between graph nodes and thus improves the accuracy of resulting digital recommendations. Indeed, as discussed in greater detail below, experimenters have established that experimental embodiments of the GNN recommendation system outperform a variety of baseline approaches with regard to generating accurate data attribute recommendations. Accordingly, in one or more implementations the GNN recommendation system is more accurate than other conventional approaches.

Additional detail regarding the GNN recommendation system will now be provided with reference to the figures. For example, FIG. 1 illustrates a schematic diagram of an example system environment (or "environment") 100 for implementing a graph neural network attribute recommendation system 102 (or "GNN recommendation system") in accordance with one or more embodiments. An overview of the GNN recommendation system 102 is described in relation to FIG. 1. Thereafter, a more detailed description of the components and processes of the GNN recommendation system 102 is provided in relation to the subsequent figures.

As shown, the environment 100 includes server(s) 104, a database 108, a client device 112, and a network 116. Each of the components of the environment 100 communicate via the network 116, and the network 116 is any suitable network over which computing devices/processing devices communicate. Example networks are discussed in more detail below in relation to FIG. 13.

As mentioned, the environment 100 includes a client device 112. The client device 112 is one of a variety of computing devices, including a smartphone, a tablet, a smart television, a desktop computer, a laptop computer, a virtual reality device, an augmented reality device, or another computing device as described in relation to FIG. 13. Although FIG. 1 illustrates a single instance of the client device 112, in some embodiments, the environment 100 includes multiple different client devices, each associated with a different user.

The client device 112 communicates with the server(s) 104 via the network 116. For example, the client device 112 provides information to the server(s) 104 such as one or more data attributes, data visualizations, and/or client device interactions. Thus, in some cases, the GNN recommendation system 102 implemented via the server(s) 104 provides and receives information based on client device interaction via the client device 112. The client device 112 also receives information from the server(s) 104 such as recommended data attributes or data visualizations.

As shown in FIG. 1, the client device 112 includes a client application 114. In particular, in one or more embodiments the client application 114 is a web application, a native application installed on the client device 112 (e.g., a mobile application, a desktop application, etc.), or a cloud-based application where all or part of the functionality is performed by the server(s) 104. Based on instructions from the client application 114, the client device 112 presents or displays information to a user, including a data recommendation (such as a data attribute recommendation or a data visualization recommendation).

As illustrated in FIG. 1, the environment 100 includes the server(s) 104. The server(s) 104 generates, tracks, stores, processes, receives, and transmits electronic data, such as data values, data attributes, and/or data visualizations. For example, the server(s) 104 receives data from the client device 112 (e.g., user interactions with data attributes or data visualizations or requests for recommendations). In response, the server(s) 104 transmits data to the client device 112 to cause the client device 112 to provide information for display (e.g., data recommendations such as data attribute recommendations or data visualization recommendations).

In some embodiments, the server(s) 104 communicates with the client device 112 to transmit and/or receive data via the network 116. In some embodiments, the server(s) 104 comprises a distributed server where the server(s) 104 includes a number of server devices distributed across the network 116 and located in different physical locations. The server(s) 104 can comprise a content server, an application server, a communication server, a web-hosting server, a multidimensional server, or a machine learning server. In one or more embodiments, the server(s) 104 further access and utilize the database 108 to store and retrieve information. As illustrated, the database 108 includes one or more dataset(s) that store data values corresponding to data attributes. In one or more implementations, the server(s) 104 query the database 108 for digital data to generate data visualizations and provide data attributes to the client device 112.

As further shown in FIG. 1, the server(s) 104 also includes the GNN recommendation system 102 as part of a digital content management system 106. For example, in one or more implementations, the digital content management system 106 stores, generates, modifies, edits, analyzes, provides, distributes, and/or shares digital content. For example, the digital content management system 106 provides tools for the client device 112, via the client application 114, to display dashboards or other data visualizations comparing data attributes for various datasets.

In one or more embodiments, the server(s) 104 includes all, or a portion of, the GNN recommendation system 102. For example, the GNN recommendation system 102 operates on the server(s) 104 to determine data attributes and/or data visualizations to recommend to the client device 112. In certain cases, as illustrated in FIG. 1, the client device 112 includes all or part of the GNN recommendation system 102. For example, in one or more embodiments the client device 112 generates data attribute recommendations and/or data visualization recommendations.

In some embodiments, the server(s) 104 train one or more machine-learning models described herein (e.g., by generating/updating a graph and training a graph neural network). The GNN recommendation system 102 on the server(s) 104 provides the one or more trained machine-learning models to the GNN recommendation system 102 on the client device 112 for implementation. Accordingly, although not illustrated, in one or more embodiments the client devices 112 utilizes the GNN recommendation system 102 to generate recommendations.

In some embodiments, the GNN recommendation system 102 includes a web hosting application that allows the client devices 112 to interact with content and services hosted on the server (s) 102. To illustrate, in one or more implementations, the client devices 112 accesses a web page or computing application supported by the server(s) 104. The client device 112 provides input to the server(s) 104 (e.g., a user interaction indicating a request for a recommendation). In response, the GNN recommendation system 102 on the server(s) 104 utilizes the graph neural network to generate a recommendation. The server(s) 104 then provides the recommendation to In some embodiments, though not illustrated in FIG. 1, the environment 100 has a different arrangement of components and/or has a different number or set of components altogether. For example, in certain embodiments, the client device 112 communicates directly with the server(s) 104, bypassing the network 116. As another example, the environment 100 includes a third-party server comprising a content server and/or a data collection server.

Figure 2:
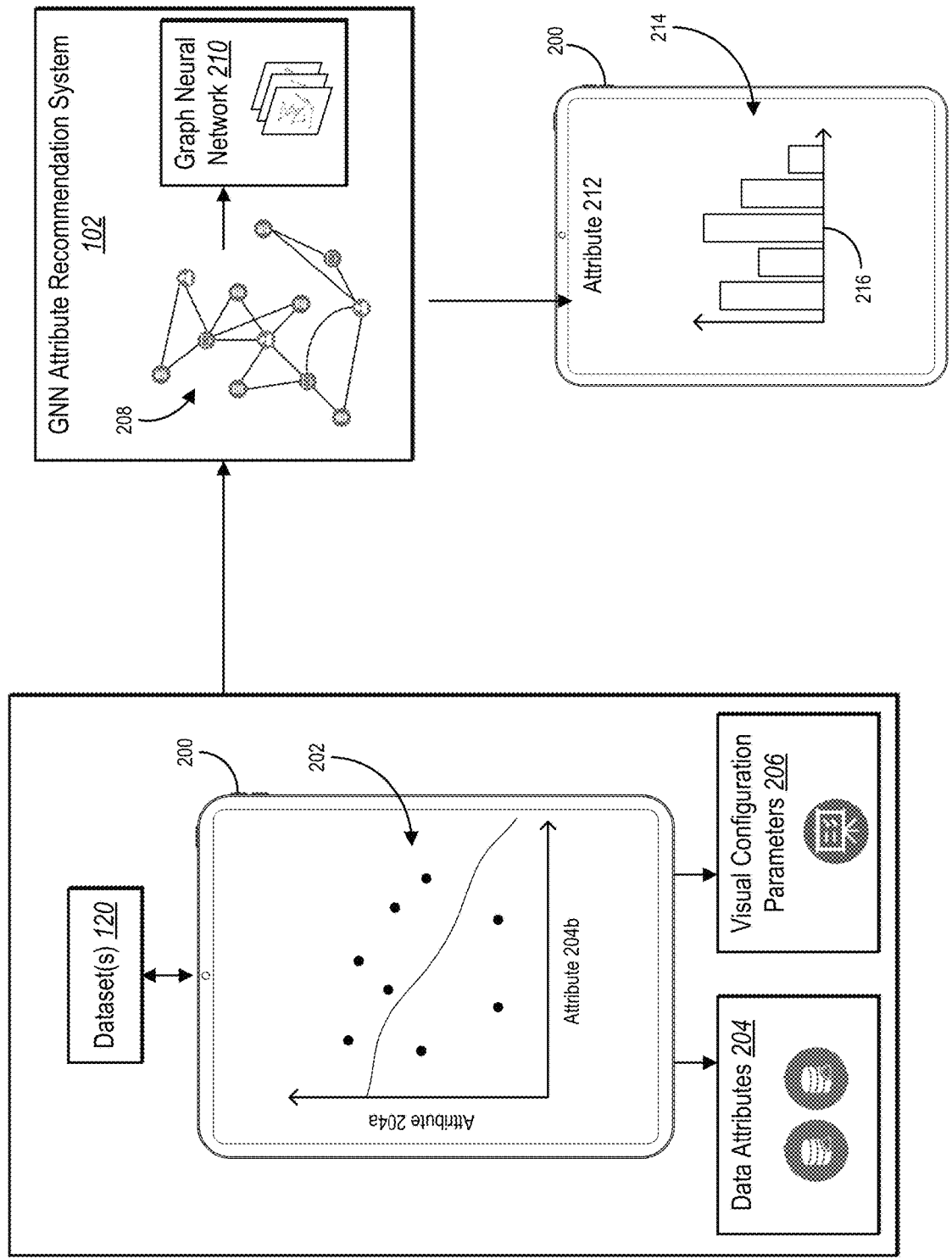
FIG. 2 illustrates an overview of generating a data recommendation utilizing a graph neural network in accordance with one or more embodiments.

As mentioned above, in one or more embodiments the GNN recommendation system 102 generates data recommendations utilizing a graph neural network. For example, FIG. 2 illustrates the GNN recommendation system 102 utilizing a graph neural network 210 and a digital graph representation 208 to generate a data recommendation 214 comprising a data attribute recommendation 212 and a data visualization recommendation 216.

As illustrated, the GNN recommendation system 102 monitors historical interactions of a client device 200 with regard to various data attributes and/or data visualizations. In particular, as shown in FIG. 2, the client device 200 accesses one or more datasets (from the dataset(s) 120) to display data attributes and/or data visualizations. Specifically, FIG. 2 shows the client device 200 accessing the dataset(s) 120 to display a data visualization 202 (e.g., a graph) that illustrates a comparison between a first attribute 204a (e.g., client device age) and a second attribute 204b (e.g., interactions with a particular website).

For example, a data attribute includes a label, classification, or type of digital data. For instance, the dataset(s) 120 can store a wide variety of data values with different data labels; a data attribute includes the data labels corresponding to the data values. Thus, in a data table that includes a column of data values with a corresponding label (e.g., classification) for the column, the data attribute includes the corresponding label. To illustrate, for a dataset comprising data values illustrating the number of interactions with a website across millions of client devices, the data attribute could include "number of website interactions."

Similarly, a data visualization includes a digital visual representation of one or more data attributes (e.g., data values corresponding to data attributes). For example, a data visualization includes a chart, graph, dashboard, or other visualization of data attributes. To illustrate, a data visualization can include a bar chart showing different data values for data attributes displayed according to various visual configuration parameters.

Visual configuration parameters include visual design details, choices, or options for a data visualization. For example, visual configuration parameters includes visual attributes selected for a particular data visualization. To illustrate, visualization configuration parameters include visualization type (e.g., graph, chart, dashboard), color, size, shape, or font, As shown, the data visualization 202 includes data attributes and one or more visual configuration parameters. Indeed, the GNN recommendation system 102 decomposes the data visualization 202 into the data attributes 204 (e.g., the attributes 204a and 204b) and visual configuration parameters 206. The visual configuration parameters 206 include the type of visualization (e.g., a scatter plot graph with best fit line), data value stylization (e.g., dots), line stylization (e.g., solid line), axis label font, etc.

The GNN recommendation system 102 monitors interactions at the client device 200. For example, the GNN recommendation system 102 identifies historical interactions at the client device 200 with the data visualization 202, the data attributes 204a-204b, and other data attributes/data visualizations. Moreover, as shown in FIG. 2, the GNN recommendation system 102 aggregates these historical interactions and generates a digital graph representation 208.

The digital graph representation 208 can include a variety of data structures representing nodes and corresponding edges connecting the nodes. For example, in one or more embodiments the digital graph representation 208 is represented as a matrix or data table with cells representing edge strengths connecting nodes representing users, data attributes, data visualizations, visualization configuration parameters, etc. For instance, the digital graph representation 208 includes user nodes (e.g., reflecting users of various client devices, such as a user of the client device 200), data attribute nodes (e.g., reflecting data attributes, such as the data attribute 204a), and visual configuration parameter nodes (e.g., reflecting a set of one or more of the visual configuration parameters 206). The digital graph representation 208 also includes edges reflecting historical interactions between users, data attributes, and/or data visualizations. Accordingly, in one or more embodiments, the GNN recommendation system 102 generates the digital graph representation 208 by mapping users, data attributes, and visual configuration parameters to nodes and determining edge strengths based on the interactions between the users, data attributes, and/or visual configuration parameters. Additional detail regarding generating a digital graph representation is provided below (e.g., in relation to FIG. 4).

As shown in FIG. 2, the GNN recommendation system 102 analyzes the digital graph representation 208 utilizing the graph neural network 210 to generate the data recommendation 214. For example, a neural network includes a model of interconnected artificial neurons (e.g., organized in layers having learned parameters or weights) that communicate and learn to approximate complex functions. In some cases, a neural network refers to an algorithm (or set of algorithms) that implements deep learning techniques to model high-level abstractions in data. For example, a neural network can include a convolutional neural network, a recurrent neural network (e.g., an LSTM), a graph neural network, or a generative adversarial neural network.

A graph neural network includes a neural network that performs inference on data organized into a graph representation. In particular, a graph neural network includes a neural network that iteratively analyzes nodes and edges of a digital graph representation to generate one or more predictions or outputs. For example, the graph neural network 210 iteratively aggregates neighboring nodes within a region of the digital graph representation 208 and applies learned parameters (at each iteration) to generate embeddings (e.g., neural network encodings) that reflect interactions between the nodes of the digital graph representation 208. To illustrate, the GNN recommendation system 102 utilizes the graph neural network 210 to generate user embeddings (corresponding to user nodes), data attribute embeddings (corresponding to data attribute nodes), and/or visual configuration embeddings (corresponding to visual configuration parameter nodes). Additional detail regarding utilizing a graph neural network to generate embeddings is provided below (e.g., in relation to FIG. 5). Moreover, additional detail regarding training a graph neural network is provided in relation to FIG. 9.

Upon generating user embeddings, data attribute embeddings, and/or visual configuration embeddings, the GNN recommendation system 102 utilizes these embeddings to generate the data recommendation 214. For example, the GNN recommendation system 102 identifies a target user (e.g., the user corresponding to the client device 200 or a different user of a different client device) and generates a recommendation particular to that target user. The term "target" refers to a candidate or focus of a computer-implemented process. Thus, a target user refers to a particular user (i.e., client device corresponding to a user) targeted to receive a recommendation. Similarly, a target data attribute refers to a candidate data attribute considered for inclusion in a recommendation. Moreover, a target data visualization refers to a candidate visualization (e.g., with one or more target visual configuration parameters and one or more target data attributes) considered for inclusion in a recommendation.

In relation to FIG. 2, the GNN recommendation system 102 identifies a target user and considers a variety of target data attributes and/or data visualizations to provide to the user. The GNN recommendation system 102 identifies a target user embedding corresponding to the target user as well as target data attribute embeddings and/or target visual configuration embeddings corresponding to the target data attribute and/or target data visualization. The GNN recommendation system 102 processes these embeddings (e.g., utilizing a non-linear function and/or neural network) to determine compatibility scores for possible recommendations. The GNN recommendation system 102 then utilizes the compatibility scores to select a particular recommendation to provide for display. Additional detail regarding generating data recommendations utilizing embeddings is provided below (e.g., in relation to FIGS. 6-8).

As shown in FIG. 2, the GNN recommendation system 102 provides, for display, a data recommendation 214. As illustrated, in one or more embodiments the data recommendation 214 includes a data attribute recommendation 212. For example, the data recommendation 214 includes a notification recommending a data attribute (from a database, csv file, table, etc.) for additional analysis or consideration. Indeed, in some embodiments, the client device 200 analyzes hundreds of different data attributes or segments to determine interactions or patterns pertinent to the underlying dataset. The GNN recommendation system 102 generates the data attribute recommendation 212 to add to (or include) in this analysis.

Moreover, as shown in FIG. 2, in one or more embodiments the data recommendation 214 includes a data visualization recommendation 216. For example, the data visualization recommendation 216 is a bar chart that compares different data attributes according to various configuration parameters. As shown, the data visualization recommendation 216 includes different configuration parameters (and/or different data attributes) than shown in the data visualization 202. Thus, the GNN recommendation system 102 analyzes various combinations of visual configuration parameters and data attributes to generate the data visualization recommendation 216 specifically for a particular target user.

Although FIG. 2 shows the data recommendation 214 with two recommendations, in one or more embodiments the GNN recommendation system 102 provides a different number of recommendations (e.g., one recommendation or more recommendations). For example, in one or more embodiments the GNN recommendation system 102 provides the data visualization recommendation 216 on its own. In some embodiments, the GNN recommendation system 102 provides the data attribute recommendation 212 on its own. In some implementations, the GNN recommendation system 102 provides other recommendations (e.g., visualization configuration parameters, other users for additional collaboration, suggested query terms or query results).

Moreover, although FIG. 2 illustrates monitoring user interacts at the client device 200 and generating recommendations for the client device 200, in one or more embodiments the GNN recommendation system 102 monitors user interactions across a variety of different devices. Indeed, the GNN recommendation system 102 monitors user interactions across hundreds or thousands of devices and processes these user interactions utilizing the graph neural network 210 to generate a recommendation for a particular target user.

Figure 3:
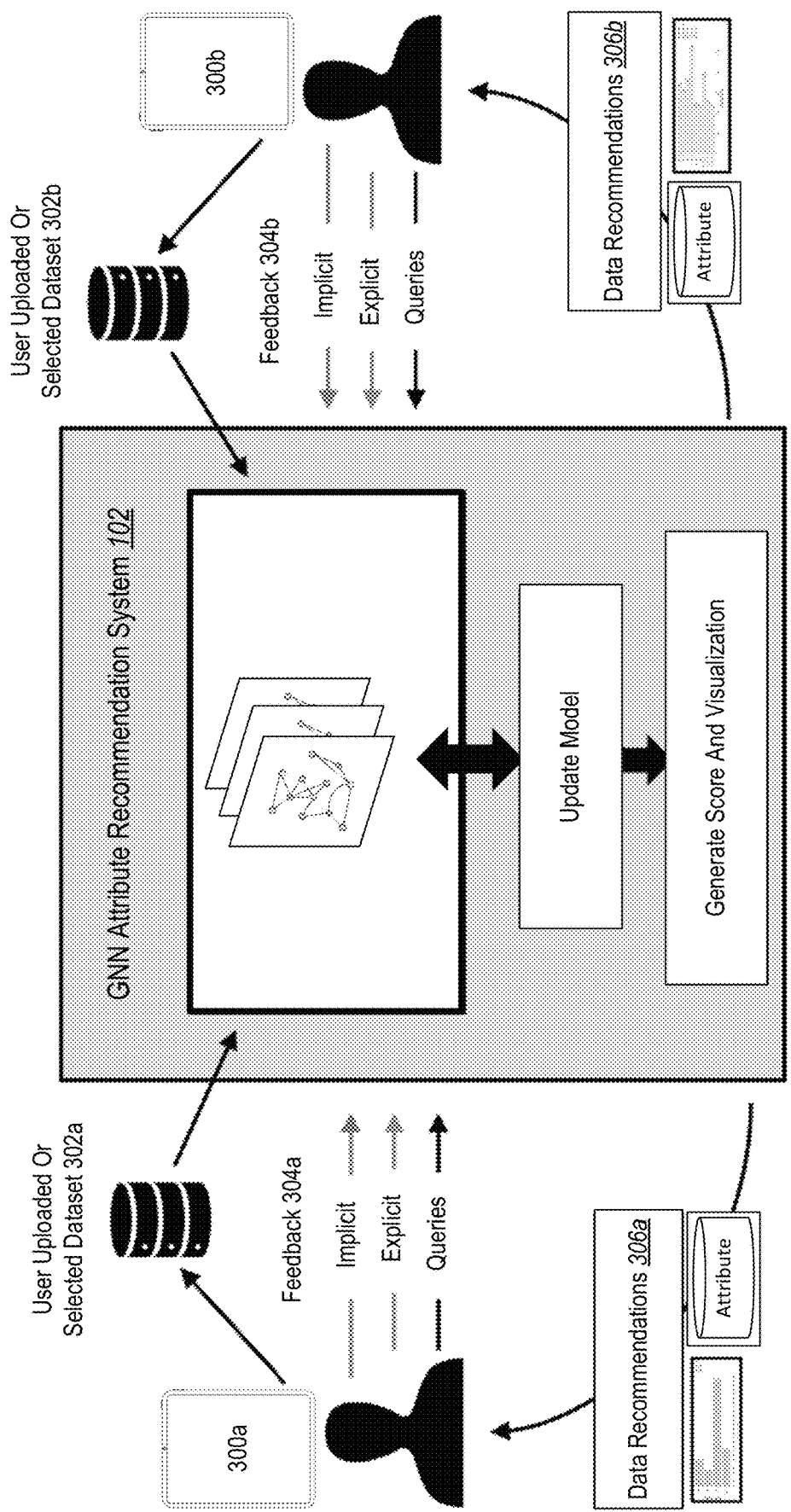
FIG. 3 illustrates a schematic diagram of iteratively providing recommendations to various computing devices and updating a graph neural network in accordance with one or more embodiments.

As mentioned previously, in one or more embodiments the GNN recommendation system 102 incorporates implicit and explicit feedback over time from client devices of various users to modify and update a graph and/or graph neural network. For example, FIG. 3 illustrates the GNN recommendation system 102 iteratively generating data recommendations for different client devices 300a-300b, receiving feedback 304a-304b, and updating a graph and/or graph neural network in accordance with one or more embodiments.

As shown, the GNN recommendation system 102 generates data recommendations 306a-306b and provides the data recommendations 306a-306b to the client devices 300a-300b (as just described in relation to FIG. 2). Moreover, the GNN recommendation system 102 monitors user interactions via the client devices 300a-300b. For instance, the GNN recommendation system 102 identifies items selected via user uploaded or selected datasets 302a-302b as part of the feedback 304a-304b.

As shown, the feedback 304a-304b can include a variety of implicit or explicit feedback signals that the GNN recommendation system 102 utilizes to update recommendation models. For example, the GNN recommendation system 102 identifies data visualizations selected or requested at the client devices 300a-300b. Similarly, the GNN recommendation system 102 identifies particular data attributes selected (either in isolation or within a data visualization) at the client devices 300a-300b. For example, a user may "like" or add a visualization to their dashboard. Similarly, a client device may select a particular data attribute to include within a new data visualization. These are all examples of explicit user feedback. Similarly, examples of implicit user feedback include when a user clicks or hover-over a visualization.

As mentioned above, suffer from data sparsity and disjoint dataset problems. In one or more embodiments, the GNN recommendation system 102 decomposes visualization into subparts: the data attributes and the set of visual design choices used in the visualization (i.e., the visual configuration parameters discussed above). In one or more embodiments, the visual configuration parameters do not include the data attributes themselves (e.g., if a data attribute from some arbitrary dataset was mapped to the color or x/y-axis, then the GNN recommendation system 102 replaces the attribute name with some set of properties such as whether it is numerical, categorical, and so on). By decomposing the user-preferred visualization into the data attributes and visual configuration parameters, the GNN recommendation system 102 can learn from user feedback. While the user feedback on the data-attributes used in the visualization may not directly transfer for visualizations created from a different dataset, the set of design choices preferred by the user does. The GNN recommendation system 102 can leverage these design choices to recommend better personalized visualizations.

In many applications or tools, there also exist direct implicit and explicit user feedback on the attributes and design-choices of interest. An attribute that included in a visualization preferred by a user provides strong feedback about the utility of that specific attributes for that user. However, there is also a weaker feedback signal that the GNN recommendation system 102 can leverage regarding the attributes that were not used in a visualization (but are available in the dataset of interest). Intuitively, the data attributes in a dataset of interest by some user will be considered more significantly than an attribute from some other dataset that was not of interest to that user. This potential source of feedback stems from the fact that a user uploaded or selected the specific dataset, therefore indicating a preference for the data attributes included in that dataset (regardless of whether or not every attributes was included in the visualizations). The GNN recommendation system 102 can also encode this information within a digital graph representation. This weak signal for user preferences provides more useful information than other arbitrary datasets in the corpus that were not selected (or explored, uploaded, etc.) by the user. The explicit and implicit signals utilized by the GNN recommendation system 102 are referred to as historical interactions throughout this disclosure.

As shown, in one or more embodiments the GNN recommendation system 102 incorporates this explicit and implicit feedback in updating a graph and corresponding graph neural network. Indeed, the GNN recommendation system 102 adjusts nodes and edges within a graph to reflect new or changed users, new or changed data attributes, and/or new or changed data visualizations (e.g., visualization configuration parameters). The GNN recommendation system 102 generates/modifies learned parameters of the graph neural network based on the modified graph. Moreover, the GNN recommendation system 102 generates modified embeddings to generate modified data recommendations. Thus, over time the GNN recommendation system 102 iteratively provides different recommendations in response to updated interactions across client devices.

Figure 4:
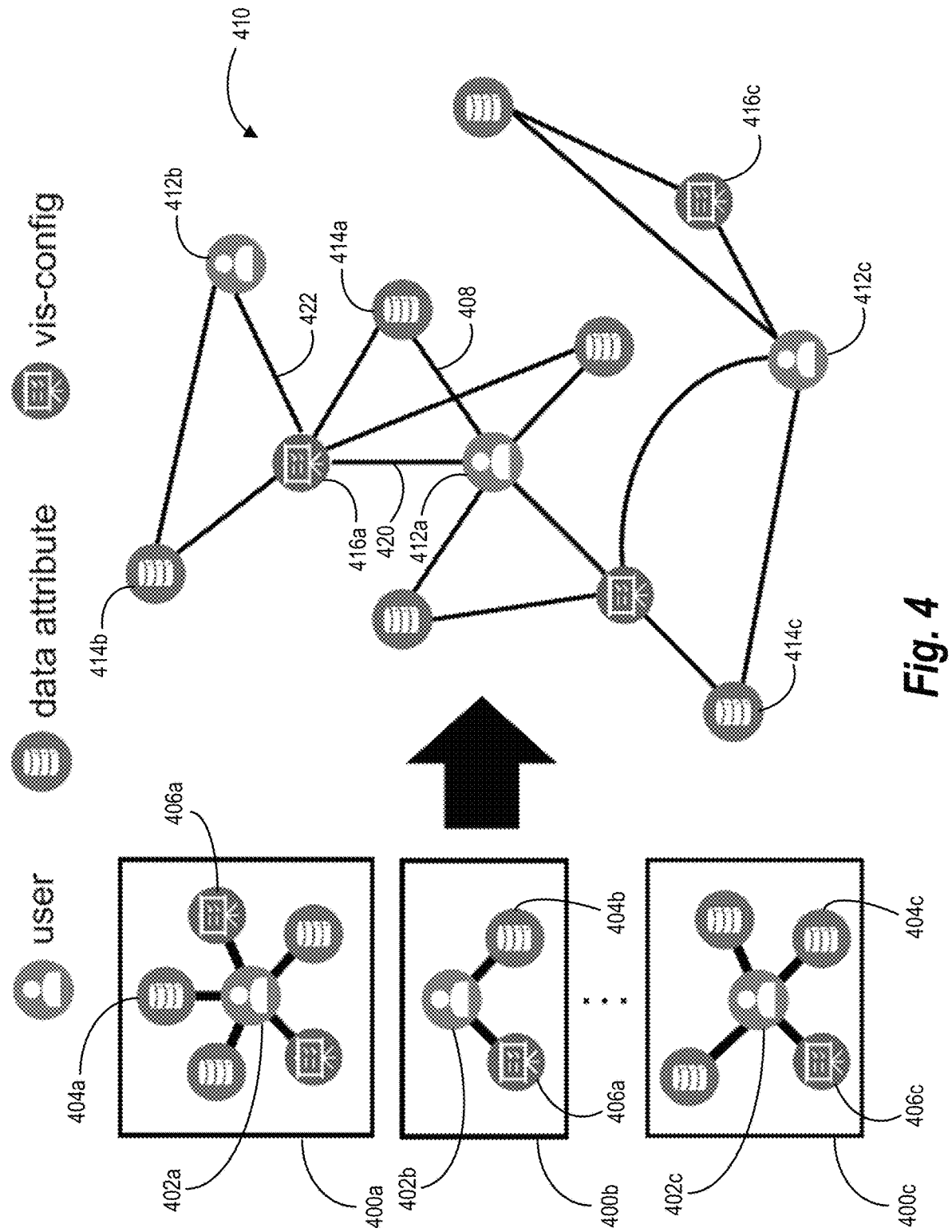
FIG. 4 illustrates a schematic diagram of generating a digital graph representation in accordance with one or more embodiments.

As mentioned above, in one or more embodiments the GNN recommendation system 102 generates (e.g., updates) a graph reflecting historical interactions between users, data attributes, and data visualizations. FIG. 4 illustrates the GNN recommendation system 102 generating a digital graph representation 410 based on a variety of historical interactions 400a-400c in accordance with one or more embodiments.

In particular, FIG. 4 illustrates historical interactions 400a-400c corresponding to three users 402a-402c. For example, FIG. 4 illustrates that the user 402a interacts with a data attribute 404a and a data visualization having a set of visual configuration parameters 406a (the user 402a also interacts with other data attributes and visual configurations parameters as shown). Similarly, FIG. 4 illustrates that user 402b interacts with a data attribute 404b and a data visualization having the set of visual configuration parameters 406a. Moreover, the user 402c interacts with a data attribute 404c and a data visualization having a set of visual configuration parameters 406c (the user 402c also interacts with other data attributes as shown).

As shown, based on the historical interactions 400a-400c, the GNN recommendation system 102 generates the digital graph representation 410. In particular, as shown, the GNN recommendation system 102 generates user nodes 412a-412c corresponding to the users 402a-402c. Moreover, the GNN recommendation system 102 generates data attribute nodes 414a-414c corresponding to the data attributes 404a-404c. Similarly, the GNN recommendation system 102 generates visualization configuration nodes 416a, 416c corresponding to the sets of visual configuration parameters 406a, 406c.

In addition, the GNN recommendation system 102 also generates edges between the nodes of the digital graph representation 410 based on the historical interactions 400a-400c. For example, the GNN recommendation system 102 generates an edge 408 between the user node 412a and the data attribute node 414a based on the historical interactions 400b (e.g., the user 402a interacting with the data attribute 404a). Similarly, because both the user 402a and the user 402b interacted with one or more visual configurations that include the visual configuration parameters 406a, the GNN recommendation system 102 generates a first edge 420 between the user node 412a and the visual configuration node 416a and a second edge 422 between the user node 412b and the visual configuration node 416a.

For example, given a visualization V from a user i for some arbitrary dataset of interest, the GNN recommendation system 102 decomposes the visualization into the set of data attributes $\mathcal{A}$ used in the visualization and the set of visual design choices (i.e., the visual configuration parameters). The GNN recommendation system 102 sets $A_{ij}=1$ for all data attributes $j \in \mathcal{A}$ and $C_{ik}=1$ for the extracted visual configuration k (which represents a complete set of visual configuration parameters). The GNN recommendation system 102 also includes nodes for the other data attributes in the user's dataset that have not yet been used in a visualization. Initially, these data attribute nodes are not connected to any other node in the graph. In addition to the two graphs A and C described above, the GNN recommendation system 102 also encodes the attributes $\mathcal{A}$ used in the specific visual configuration k using another graph D. More specifically, $D_{jk}=1$ for all $j \in \mathcal{A}$ and k is the visual configuration of the visualization $\mathcal{V}$. This approach results in three graphs, encoded by the sparse adjacency matrices A, C, and D. Given these graphs, in one or more embodiments the GNN recommendation system 102 derives a larger unified graph as follows:

$$G = \begin{bmatrix} \blacksquare & A & C \\ A^T & \blacksquare & D \\ C^T & D^T & \blacksquare \end{bmatrix}$$

FIG. 4 illustrates an example of this resulting unified graph for three users. Notably, in the example digital graph representation 410 of FIG. 4 there is no node directly reflecting a visualization; however, one can generate a valid visualization by combining one or more data attributes with a set of one or more visual configuration parameters.

Although FIG. 4 illustrates generating a digital graph representation that includes both data attribute nodes and visual configuration nodes, in some embodiments, the GNN recommendation system 102 generates a digital graph representation with different nodes. For example, in some embodiments, the GNN recommendation system 102 generates the digital graph representation 410 with user nodes and data attribute nodes (but without visual configuration nodes). In one or more embodiments, the GNN recommendation system 102 generates the digital graph representation 410 with user nodes and visual configuration nodes. Moreover, in some embodiments, the GNN recommendation system 102 generates the digital graph representation 410 with other nodes.

Moreover, in one or more embodiments, the GNN recommendation system 102 generates the heterogeneous graph to include additional features or node representations. For example, in some embodiments, the graph G does not include information regarding visual configurations. In other embodiments, the graph G includes other feature representations, such as a meta-feature matrix. For example, in some implementations the GNN recommendation system 102 maps data attributes to a common feature space. In some embodiments, the GNN recommendation system 102 generates a matrix of these embeddings and utilizes this matrix as part of the graph G. Thus, for example, the graph G can include a meta-feature matrix as described by Xin Qian, Ryan A. Rossi, Fan Du, Sungchul Kim, Eunyee Koh, Sana Malik, Tak Yeon Lee, and Joel Chan in ML-based Visualization Recommendation: Learning to Recommend Visualizations from Data (2020) (hereinafter ML-based Visualization), which is incorporated herein by reference.

Indeed, in one or more embodiments, the GNN recommendation system 102 derives meta-feature matrix M that consists of a fixed-length meta-feature vector m for every attribute across all datasets. In one or more embodiments, the meta-feature vector of an attribute (from an arbitrary dataset) captures the important data characteristics of the attribute in a shared low-dimensional space where attributes from any arbitrary dataset can be compared and leveraged in learning. In one or more embodiments, the GNN recommendation system 102 maps every attribute to a shared k-dimensional meta-feature space that allows the GNN recommendation system 102 to learn from user-level attribute preferences across all the different datasets of the users. Significantly, in one or more implementations the shared meta-feature space is independent of the specific datasets and the meta-features represent general functions of an arbitrary attribute, independent of the user or dataset that it arises. This approach enables the GNN recommendation system 102 to learn from the user-level attribute preferences, despite that those preferences are on entirely different datasets. Accordingly, in one or more embodiments, the GNN recommendation system 102 derives the following heterogeneous graph G:

$$G = \begin{bmatrix} \blacksquare & A & C & \blacksquare \\ A^T & \blacksquare & D & M \\ C^T & D^T & \blacksquare & \blacksquare \\ \blacksquare & M^T & \blacksquare & \blacksquare \end{bmatrix}$$

As discussed above, in some implementations the GNN recommendation system 102 utilizes a graph neural network to iteratively generate embeddings from a digital graph representation. For example, FIG. 5 illustrates generating and updating embeddings utilizing a graph neural network in accordance with one or more embodiments.

Figure 5:
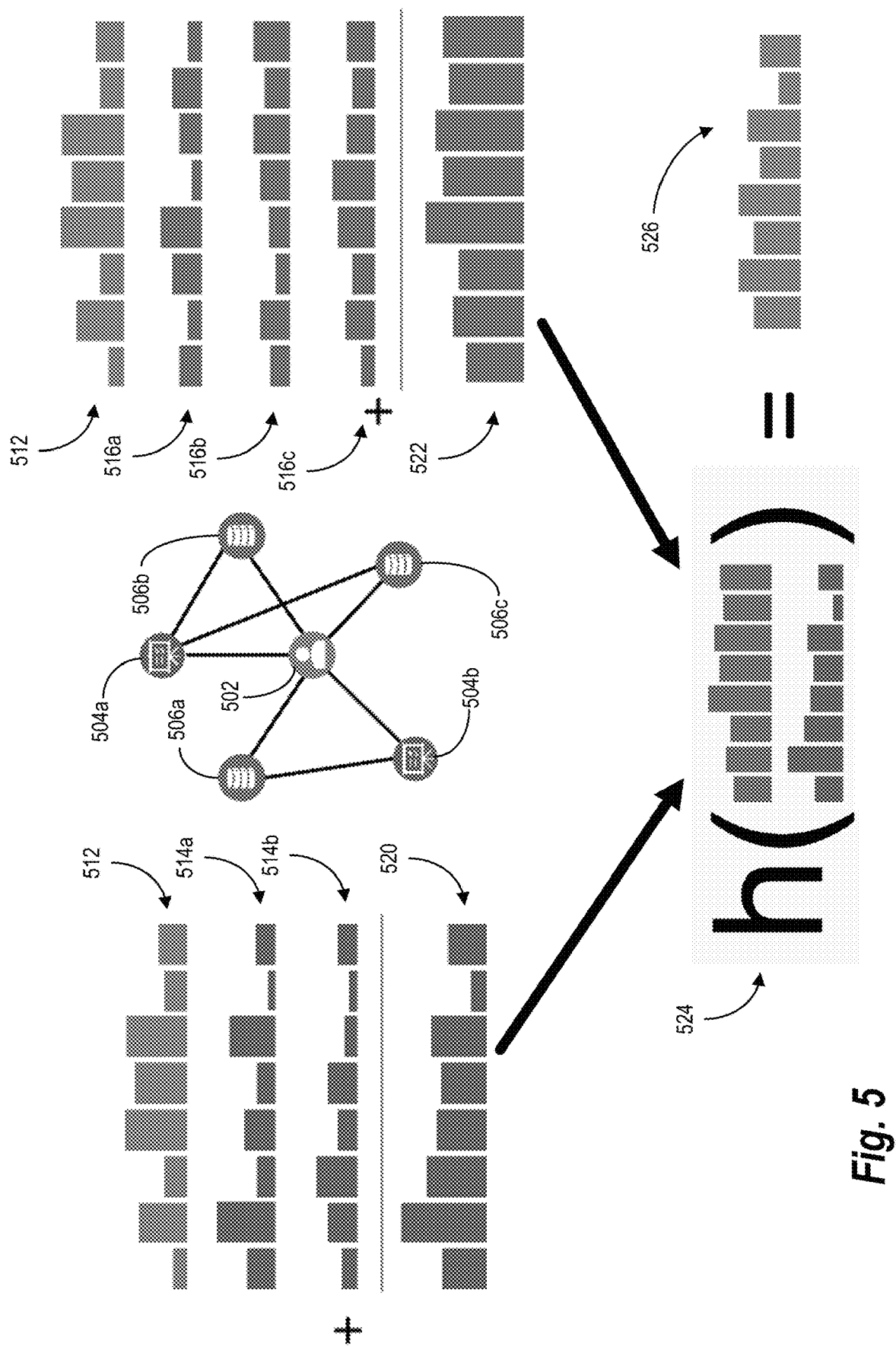
FIG. 5 illustrates a schematic diagram of generating embeddings from a graph utilizing a graph neural network in accordance with one or more embodiments.

In particular, FIG. 5 illustrates a node 502 and a plurality of neighborhood nodes. In particular, the plurality of neighborhood nodes includes neighboring data attribute nodes 506*a*-506*c* and neighboring visualization configuration nodes 504*a*-504*b*. The GNN recommendation system 102 determines the neighboring nodes for the node 502 based on edges from the digital graph representation. For example, each of the neighboring nodes in FIG. 5 have an edge connected to the user node 502. The GNN recommendation system 102 can identify neighboring nodes utilizing an alternative approach. For example, in some embodiments the GNN recommendation system 102 identifies neighboring nodes based on satisfying a threshold edge strength to a node or based on a different number of edges (e.g., neighboring nodes that fall within two edges of a particular node).

As mentioned previously, in some embodiments the GNN recommendation system 102 iteratively aggregates and applies a graph neural network to neighborhood node embeddings to model complex interactions between the various nodes. FIG. 5 illustrates one of these iterations. For example, the GNN recommendation system 102 identifies embeddings for each of the neighboring nodes. Specifically, the GNN recommendation system 102 identifies a user embedding 512 (for the user node 502), visual configuration embeddings 514*a*-514*b* (for the visual configuration nodes 504*a*-504*b*), and data attribute embeddings 516*a*-516*c* (for the data attribute nodes 506*a*-506*c*).

As shown in FIG. 5, the GNN recommendation system 102 aggregates these various embeddings. In particular, the GNN recommendation system 102 aggregates or combines the user embedding 512 and the visual configuration embeddings 514*a*-514*b* to generate an aggregated neighbor embedding 520. Similarly, the GNN recommendation system 102 aggregates or combines the user embedding 512 and the data attribute embeddings 516*a*-516*c* to generate an aggregated neighbor embedding 522. The GNN recommendation system 102 can utilize a variety of aggregator models to aggregate embeddings from neighborhood nodes. For example, the GNN recommendation system 102 utilizes a sum aggregator model, a mean aggregator model, an LSTM aggregator model, or a pooling aggregator model.

The GNN recommendation system 102 processes the aggregated neighbor embeddings 520, 522 (e.g., together with a representation of the digital graph representation) utilizing one or more layers of the graph neural network 524.

In particular, the GNN recommendation system 102 applies learned parameters (e.g., weights) of a layer of the graph neural network 524 to the aggregated neighbor embeddings 520, 522. In this manner, the GNN recommendation system 102 generates a user embedding 526 for the user node 502.

As shown in FIG. 5, the GNN recommendation system 102 utilizes the user embedding 526 for future iterations. In particular, the GNN recommendation system 102 associates the user embedding 526 with the user node 502 for subsequent iterations in applying layers of the graph neural network. Accordingly, the GNN recommendation system 102 iteratively applies layers of the graph neural network 524 to generate and update embeddings for the nodes of the digital graph representation.

Although FIG. 5 illustrates generating the user embedding 526 for the user node 502, in one or more embodiments the GNN recommendation system 102 repeats the process illustrated in FIG. 5 to generate embeddings for each node of a digital graph representation. For example, the GNN recommendation system 102 generates a data attribute embedding for the data attribute node 506c (from neighboring nodes of the data attribute node 506c) and a visual configuration embedding for the visual configuration node 504a (from neighboring nodes of the visual configuration node 504a).

As mentioned, the GNN recommendation system 102 iteratively applies layers of the graph neural network. In some embodiments, the GNN recommendation system 102 utilizes a slightly unique approach for the first iteration (e.g., for the initial layer of the graph neural network 524). For example, in some embodiments the GNN recommendation system 102 uses feature vectors, random vectors, or a singular value decomposition of the digital graph representation to initialize the first layer of the graph neural network 524. In some embodiments, the GNN recommendation system 102 also uses a function over an adjacency matrix of the digital graph representation to initialize the first layer of the graph neural network 524. In some implementations, the GNN recommendation system 102 combines (e.g., adds) the digital graph representation and the identity matrix. In one or more embodiments, the GNN recommendation system 102 utilizes the meta-feature matrix of users, attributes, etc. for the initial layer. For example, the GNN recommendation system 102 utilizes the meta-feature approach described in ML-based Visualization (incorporated above).

For example, in one or more implementations the GNN recommendation system 102 obtains a low-dimensional rank-d approximation of G denoted as $\phi(G)$. Given the large heterogeneous graph G and $\phi(G)$, the GNN recommendation system 102 utilizes a graph neural network layer of the following form:

$$H^{k+1} = f(H^{(k)}, \ell(G))$$

Where f is a non-linear function over $H^{(k)}$ and the graph G. For the initial GNN layer k=0:

$$H^1 = f(\phi(G), \ell(G))$$

where $H^0 = \phi(G) \in \mathbb{R}^{n \times d}$. In one or more embodiments, the GNN recommendation system 102 uses $\phi(G) = U$ where U is derived by solving the singular value decomposition of G, that is, $G \approx G_d \approx USV^T$ and hence $G_d$ is the best rank-d approximation of G. The foregoing is only one such possibility of $\phi$. The GNN recommendation system 102 can utilize a variety of interchangeable components. Thus, $\phi$ can be interchanged with another function over the sparse adjacency matrix G). In general, $H^0$ can also be other features (or even random features). Accordingly, they are not required to be dependent on the graph $H^0 = \phi(G)$.

In addition, $\ell$ can be a variety of functions over a graph's adjacency matrix such as the normalized Laplacian or random walk matrix such as $$\ell(G) = Q^{-\frac{1}{2}} G Q^{-\frac{1}{2}}$$

where Q=diag(G) the diagonal node degree matrix of G. To include the features of the node itself in the propagation, the GNN recommendation system 102 utilizes G+I where I is the identity matrix. In one or more embodiments, the GNN recommendation system 102 can also set $H^0$ to be the meta-feature matrix of the users, attributes, and so on.

Accordingly, one model of the graph neural network is as follows:

$$f(H^{(k)}, \ell(G)) = \sigma(\ell(G) H^{(k)} W^{(k)})$$

where $\sigma$ is a non-linear activation function and $W^{(k)}$ is the weight matrix of the kth layer.

Besides the sum aggregator used implicitly in the foregoing equation, the GNN recommendation system 102 can also leverage other relational neighborhood aggregators, such as the mean aggregator, LSTM aggregator, pooling aggregator, among others. For instance, the mean aggregator can be articulated:

$$h_i^{(k)} = \sigma(W^{k-1} \cdot \text{MEAN}(\{h_i^{(k-1)}\} \cup \{h_j^{(k-1)}, \forall j \in N(i)\}))$$

Or, more generally $$h_i^{(k)} = \sigma(W^{k-1} \cdot \text{AGGR}(\{h_i^{(k-1)}\} \cup \{h_j^{(k-1)}, \forall j \in N(i)\}))$$

where AGGR(·) is one of a variety of aggregator functions and $W^{k-1}$ is the learned transformation matrix (i.e., learned parameters of the graph neural network). The GNN recommendation system 102 repeats this process for each node in the graph.

In some embodiments, the GNN recommendation system 102 combines different types of embeddings utilizing different weights. For example, the GNN recommendation system 102 can utilize a first weight for aggregate embeddings based on data attributes and utilize a second weight for aggregate embeddings based on visual configuration parameters.

Although FIG. 5 (and the foregoing description) illustrates aggregating data attribute embeddings and visual configuration embeddings separately, in some embodiments the GNN recommendation system 102 aggregates them together. For example, in one or more embodiments the GNN recommendation system 102 aggregates neighboring nodes to generate an aggregated neighbor embedding and process the aggregated neighbor embedding utilizing learned parameters of the graph neural network 524.

Figure 6:
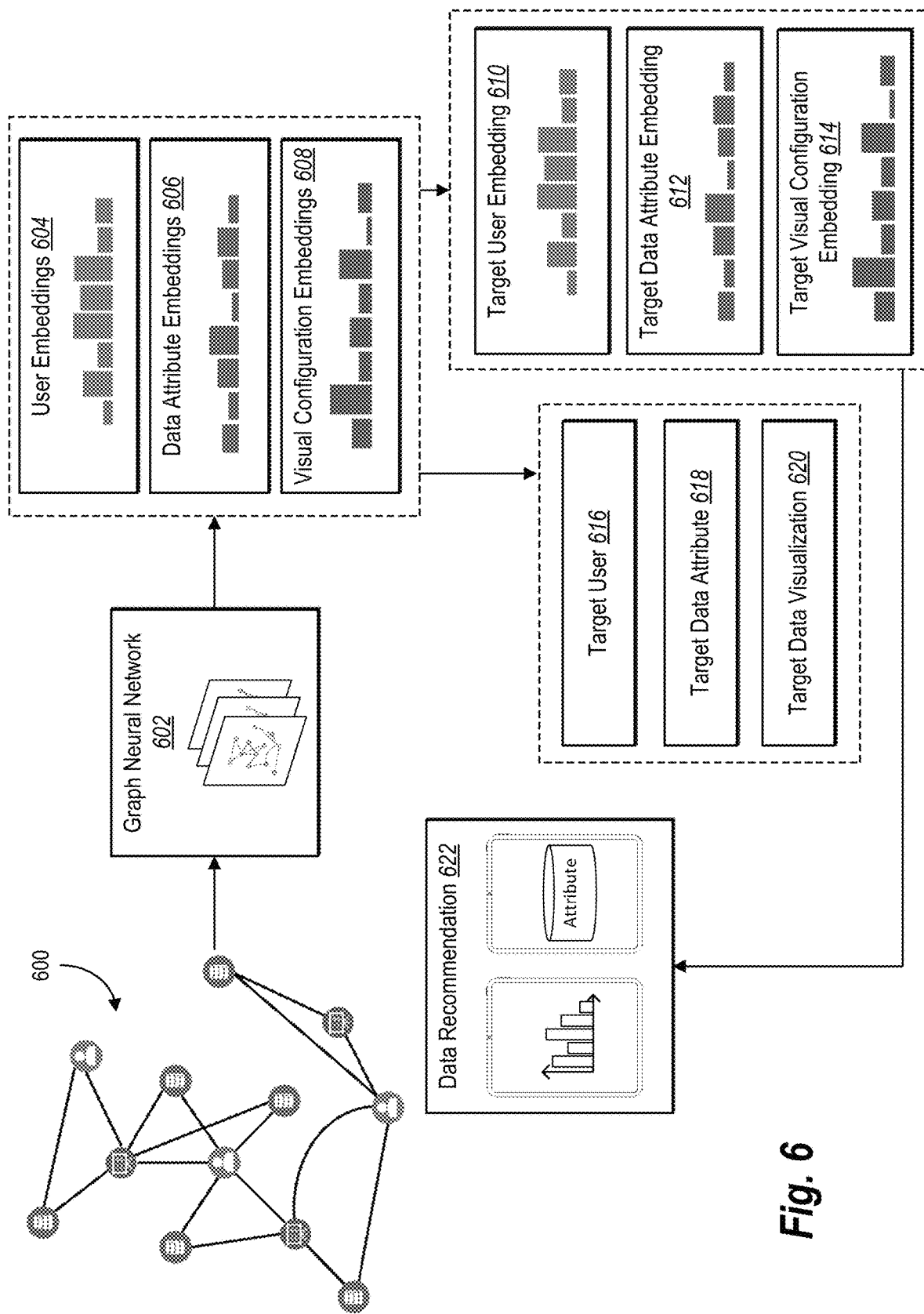
FIG. 6 illustrates generating a recommendation utilizing embeddings generated from a graph neural network in accordance with one or more embodiments.

As discussed previously, in one or more embodiments the GNN recommendation system 102 generates recommendations for a target user based on embeddings from the graph neural network. For example, FIG. 6 illustrates generating a recommendation 610 in accordance with one or more embodiments. In particular, FIG. 6 illustrates a digital graph representation 600 (e.g., the digital graph representation 410). The GNN recommendation system 102 processes the digital graph representation 600 utilizing the graph neural network 602 (as described in relation to FIG. 5) and generates a variety of embeddings. Specifically, the GNN recommendation system 102 generates user embeddings 604, data attribute embeddings 606, and visual configuration embeddings 608.

As illustrated, the GNN recommendation system 102 generates the data recommendation 622 (e.g., a data attribute recommendation and/or a data visualization recommendation) for a target user 616. Specifically, the GNN recommendation system 102 identifies a target user 616 and a target user embedding 610 corresponding to the target user 616. In particular, the GNN recommendation system 102 identifies the target user embedding 610 from the user embeddings 604 by extracting an embedding corresponding to a user node of the target user within the graph 600.

Upon identifying a target user, in one or more embodiments the GNN recommendation system 102 analyzes different target data attributes and/or target data visualizations to determine the data recommendation 622. For example, as shown in FIG. 6, the GNN recommendation system 102 identifies a target data attribute 618 and/or a target data visualization 620. The GNN recommendation system 102 identifies a target data attribute embedding 612 corresponding to the target data attribute 618 and a target visual configuration embedding 614 corresponding to the target data visualization 620. In particular, the GNN recommendation system 102 extracts the target data attribute embedding 612 from the data attribute embeddings 606 (e.g., based on a node of the graph 600 corresponding to the target data attribute). Similarly, the GNN recommendation system 102 extracts the target visual configuration embedding 614 from the visual configuration embeddings 608 (e.g., based on a node of the graph corresponding to a set of target visual configuration parameters for the target data visualization 620).

As shown, the GNN recommendation system 102 compares/combines the target user embedding 610, the target data attribute embedding 612, and the target visual configuration embedding 614 to generate the data recommendation 622. As discussed in greater detail below (e.g., with regard to FIGS. 7-8), the GNN recommendation system 102 generates compatibility scores utilizing the target user embedding 610, the target data attribute embedding 612, and the target visual configuration embedding and then selects the data recommendation 622 utilizing the compatibility scores.

Indeed, although FIG. 6 illustrates a single target data attribute and a single target data visualization, in one or more embodiments the GNN recommendation system 102 analyzes a variety of target data attributes and/or target data visualizations before surfacing a data recommendation. For example, in some embodiments, the GNN recommendation system 102 generates compatibility scores for a variety of different target data attributes and/or target data visualizations and then selects the data recommendation 622 by comparing the resulting compatibility scores (e.g., selecting the highest compatibility score or a top number/percentage of compatibility scores).

Although FIGS. 5 and 6 illustrate the GNN recommendation system 102 utilizing both data attribute embeddings and data visualization embeddings, in some embodiments the GNN recommendation system 102 utilizes one of these embeddings (or different embeddings). For example, in some implementations the GNN recommendation system 102 utilizes a digital graph representation that does not include visualization configuration nodes. Accordingly, in one or of these embodiments, the GNN recommendation system 102 utilizes data attribute embeddings (without data visualization embeddings) to generate the data recommendation.

Moreover, in generating a data recommendation that includes a data visualization recommendation, the GNN recommendation system 102 can decompose the recommended data visualization into data attribute and visual configuration components. For example, the GNN recommendation system 102 can identify the target data visualization 620 as a set of data attributes and a set of visual configuration parameters. In such embodiments, the GNN recommendation system 102 identifies a data attribute embeddings for the target data visualization 620 and a visual configuration embedding for the target visualization. The GNN recommendation system 102 compares/combines these embeddings to generate the data recommendation 622.

Figure 7:
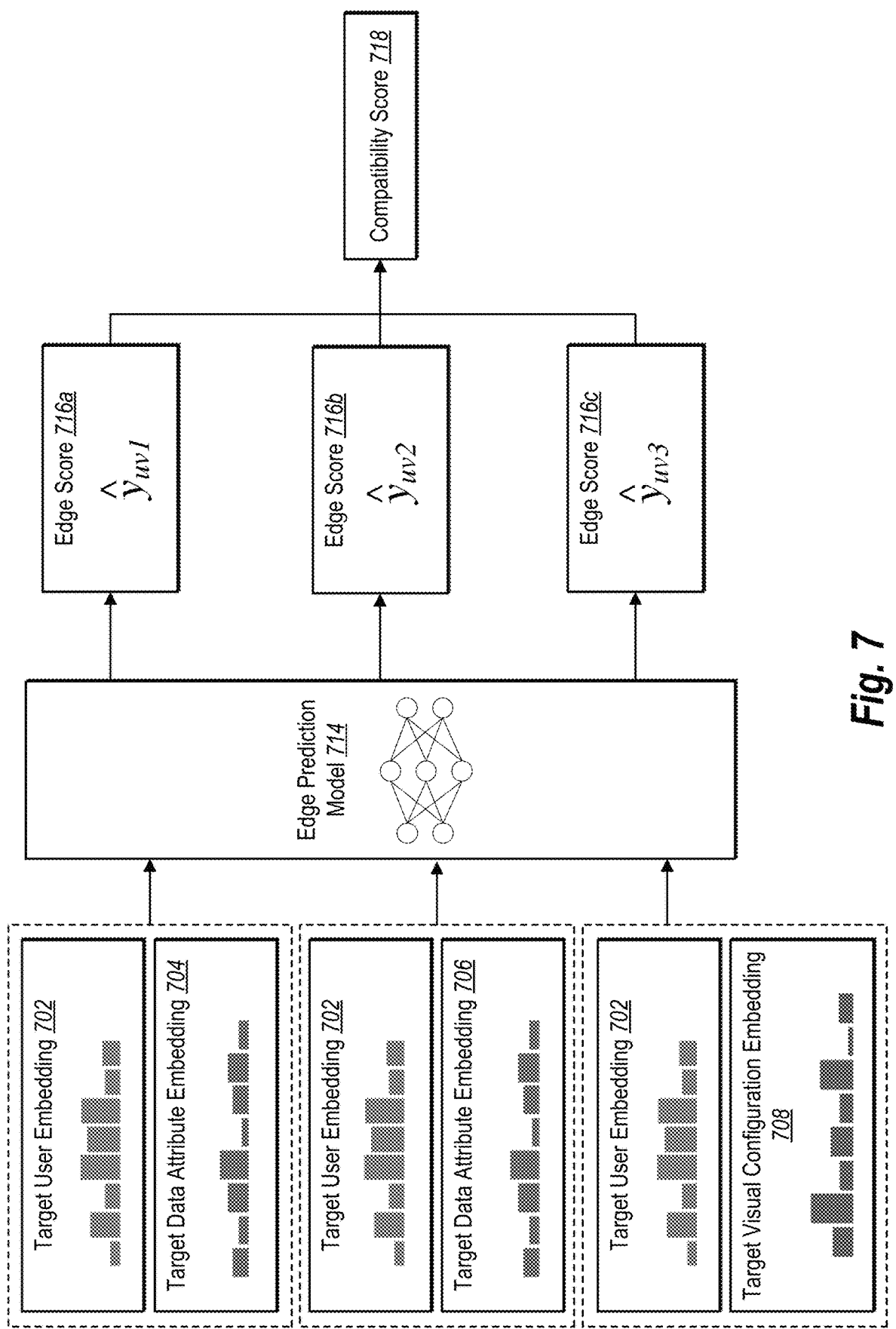
FIG. 7 illustrates a schematic diagram of generating a plurality of edge scores for embedding pairs to determine a compatibility score in accordance with one or more embodiments.
Figure 8:
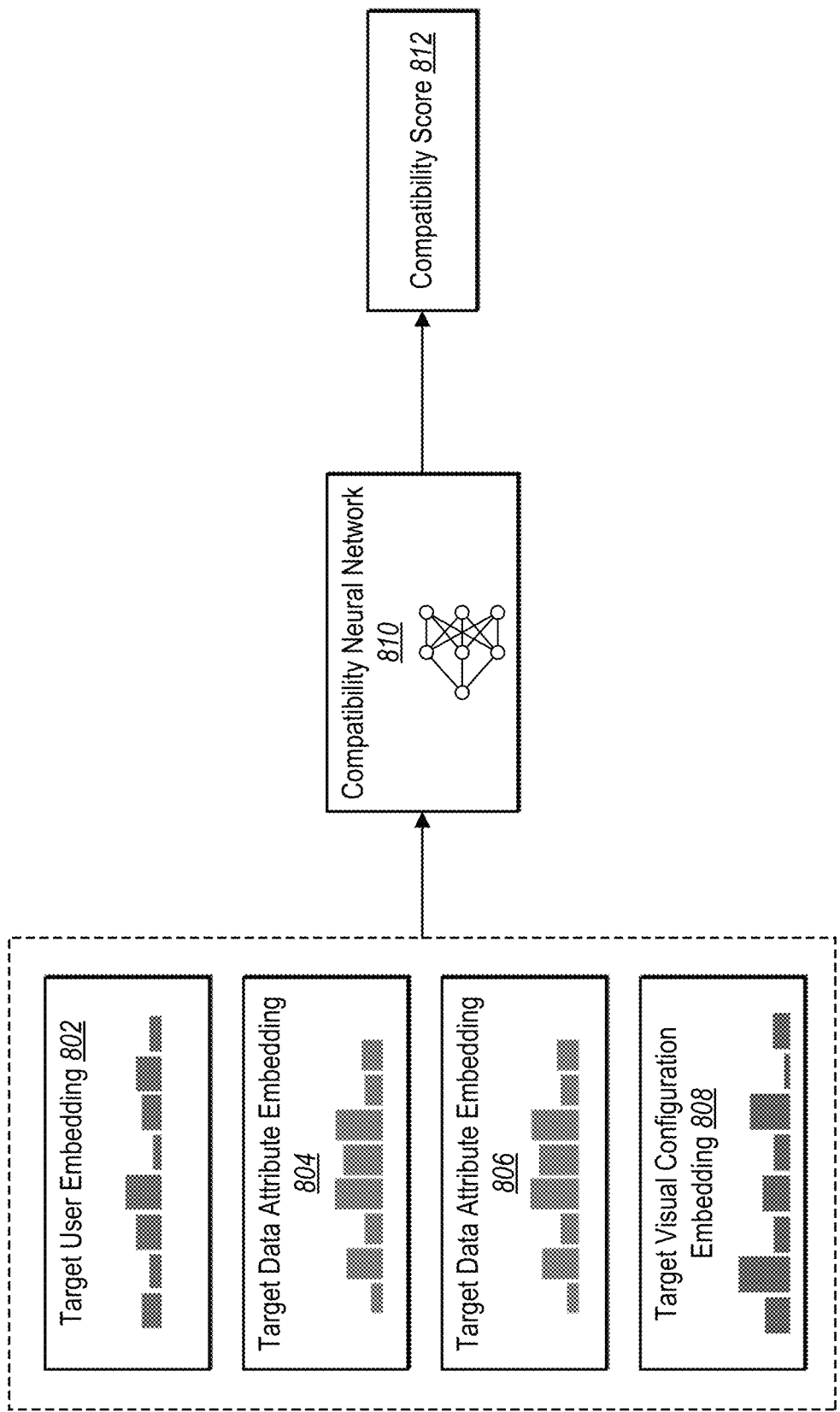
FIG. 8 illustrates a schematic diagram of utilizing a compatibility neural network to generate a compatibility score from embeddings in accordance with one or more embodiments.

As just mentioned, in some implementations the GNN recommendation system 102 generates compatibility scores to select one or more data recommendations to provide to a client device. In particular, the GNN recommendation system 102 combines embeddings to determine compatibility scores and select recommendations. FIGS. 7-8 illustrate combining embeddings to generate compatibility scores in accordance with one or more embodiments. In particular, FIG. 7 illustrates combining embedding pairs to determine edge scores and then combining edge scores to determine compatibility scores. FIG. 8 illustrates utilizing combining embeddings utilizing a compatibility neural network to determine compatibility scores.

For example, FIG. 7 illustrates determining a compatibility score 718 for a target user relative to a target data visualization. Specifically, the GNN recommendation system 102 decomposes the target data visualization into two target data attributes (a first target data attribute and a second target data attribute) and a set of target visual configuration parameters. The GNN recommendation system 102 then identifies a target user embedding 702 corresponding to a node of the target user, a target data attribute embedding 704 corresponding to a node of first target data attribute, a target data attribute embedding 706 corresponding to a node of the second target data attribute, and a target visual configuration embedding 708 corresponding to a node of the set of target visual configuration parameters.

Moreover, as illustrated in FIG. 7, the GNN recommendation system 102 divides these embeddings into embedding pairs. For example, the GNN recommendation system 102 determines a first embedding pair that includes the target user embedding 702 and the target data attribute embedding 704. Similarly, the GNN recommendation system 102 determines a second embedding pair that includes the target user embedding 702 and the target data attribute embedding 706. Moreover, the GNN recommendation system 102 determines a third embedding pair that includes the target user embedding 702 and the target visual configuration embedding 708.

The GNN recommendation system 102 analyzes these embedding pairs utilizing an edge prediction model 714. In one or more embodiments, the edge prediction model 714 is a computer-implemented model for comparing two embeddings and predicting an edge score (e.g., an edge strength, probability, or similarity between the two embeddings). For example, the edge prediction model 714 can include a non-linear model that combines two embeddings. Thus, in one or more embodiments, the edge prediction model 714 is a model that applies a dot product between two embeddings. In some implementations, the edge prediction model 714 has a neural network architecture with learned weights. To illustrate, the edge prediction model 714 includes a multi-layer perceptron or other neural network architecture.

As shown, the GNN recommendation system 102 utilizes the edge prediction model 714 to generate edge scores 716a-716c for the embedding pairs. In particular, the GNN recommendation system 102 generates the edge score 716a for the first embedding pair, the edge score 716*b* for the second embedding pair, and the edge score 716*c* for the third embedding pair. Thus, each of the edge scores 716*a*-716*c* reflect a predicted measure of strength or interest (e.g., interest probability) between the target user and the corresponding data attribute/visual configuration.

As illustrated in FIG. 7, the GNN recommendation system 102 combines the edge scores 716*a*-716*c* to determine the compatibility score 718. In one or more embodiments, the GNN recommendation system 102 multiplies the edge scores to determine the compatibility score 718. The GNN recommendation system 102 can utilize other approaches to combine the edge scores (e.g., add, multiply, divide, etc.).

For example, in one or more implementations, the GNN recommendation system 102 predicts the probability of an edge (u, v) existing by deriving a score (i.e., an edge score) between the representations of node $h_u$ and $h_v$ using a function (e.g., the edge prediction model 714, such as an MLP or a dot product):

$$\hat{y}_{uv} = g(h_u, h_v)$$

From the above, the GNN recommendation system 102 derives a score for user i for a target visualization V by decomposing it into the visual configuration t (set of visual design choices) and the attributes used $r_1, \ldots, r_s$. The GNN recommendation system 102 obtains the probability of each of these components. For instance, for user i and the configuration t, the GNN recommendation system 102 has $y_{it}$, and similarly, for attribute r the GNN recommendation system 102 has $y_{ir}$. The GNN recommendation system 102 combines these probabilities to get a compatibility score for the overall visualization by taking the product:

$$\hat{y} = g(h_i, h_t) \prod_{j \in \mathcal{A}} g(h_i, h_j)$$

where $\hat{y}$ is the final predicted compatibility score for the visualization V for user i. Thus, a user-relevant visualization $\mathcal{V}$ receives a high compatibility score when both the probability of the visual configuration g ($h_i$, $h_t$) for user i and the probability of each of the data attributes $j \in \mathcal{A}$, g($h_i$,$h_j$) that can be assigned to the visual configuration are high.

Although FIG. 7 illustrates embedding pairs that include at least one user embedding, the GNN recommendation system 102 can determine other embedding pairs. For example, the GNN recommendation system 102 can determine a data attribute that is a best match for a particular visual configuration. In such an embodiment, the GNN recommendation system 102 can utilize an embedding pair comprising a visualization configuration embedding and a data attribute embedding. Similarly, in some embodiments, the GNN recommendation system 102 can utilize user embeddings in an embedding pair (e.g., to determine a corroboration strength or corroboration likelihood in generating a particular user recommendation to another user).

Moreover, although FIG. 7 illustrates a visual configuration embedding, the GNN recommendation system 102 can operate without visual configuration embeddings. Indeed, in some embodiments, the GNN recommendation system 102 generates data attribute recommendations or user recommendations without considering particular visual configurations.

As mentioned above, FIG. 8 illustrates generating a compatibility score utilizing a compatibility neural network 810. Specifically, the GNN recommendation system 102 utilizes the compatibility neural network 810 to generate compatibility scores directly for a particular combination of users, data attributes, and/or visual configurations. Thus, rather than identifying individual edge scores (as discussed with regard to FIG. 7), the GNN recommendation system 102 utilizes the embeddings and the compatibility neural network 810 to predict the compatibility score 812 directly.

As shown in FIG. 8, the GNN recommendation system 102 determines a target user embedding 802 for a target user. The GNN recommendation system 102 also identifies a target data attribute embedding 804 (for a first target data attribute) and a target data attribute embedding 806 (for a second target data attribute). The GNN recommendation system 102 also determines a target visual configuration embedding 808 (for a target visualization configuration of a target data visualization). The GNN recommendation system 102 analyzes these embeddings utilizing learned weights of the compatibility neural network 810 to generate the compatibility score 812.

The compatibility neural network 810 can include a variety of neural network architectures. In some embodiments, the compatibility neural network includes a convolutional neural network trained to generate compatibility scores (e.g., by comparing predicted compatibility scores with ground truth compatibility scores determined from graph edge weights or crowd sourcing). Additional detail regarding neural network training is provided below (e.g., in relation to FIG. 9).

For example, given a user i and a visualization $\mathcal{V} = (X_{ij}^{(k)}, C_t)$ to score from a dataset, the GNN recommendation system 102 leverages the user-specific embeddings learned from the graph neural network to learn another model that outputs a score for a visualization (or data attribute) directly. The GNN recommendation system 102 concatenates the embedding of user i, visual configuration t, along with the embeddings of each attribute $r_1, \ldots, r_s$ used in the visualization. More formally:

$$\psi(\mathcal{V} = (X_{ij}^{(k)}, C_t)) = [u_i z_t v_{r1} \ldots v_{rs}]$$

where $u_i$ is the embedding of user i, $z_t$ is the embedding of the visual configuration $C_t$, and $v_{r1} \ldots v_{rs}$ are the embeddings of the attributes used in the visualization being scored for user i. For clarity, the foregoing equation uses different symbols for each node type, however, each node has a specific index in H, hence $z_t$ and $h_t$ are equivalent.

The GNN recommendation system 102 leverages the user, visual configuration, and attribute embeddings as input to a deep multilayer neural network with L fully-connected layers.

$$\psi(\mathcal{V} = (X_{ij}^{(k)}, C_t)) = [u_i z_t v_{r1} \ldots v_{rs}]^T$$

$$q_1 = \sigma_1(W_1 \phi(V) + b_1)$$

$$q_2 = \sigma_2(W_2 q_1 + b_1)$$

$$\ldots$$

$$q_L = \sigma_L(W_L q_{L-1} + b_L)$$

$$\hat{y} = \sigma(h^T q_L)$$

where $W_L$, $b_L$, and $\sigma_L$ are the weight matrix, bias vector, and activation function for layer L. Further, $\hat{y} = \sigma(h^T q_L)$ is the output layer where $\sigma$ is the output activation function and $h^T$ denotes the edge weights of the output function. For the hidden layers, the GNN recommendation system 102 uses ReLU as the activation function. For visualizations that do not use s attributes, the GNN recommendation system 102 pads the remaining unused attributes with zeros. This approach allows the GNN recommendation system 102 to be flexible for visualizations with different numbers of attributes. Hence, ŷ is the predicted compatibility score for user i.

In addition to visualization recommendations, in one or more embodiments the GNN recommendation system 102 also generates personalized design choice recommendations (e.g., chart-type), personalized attribute recommendation, personalized visualization-configuration recommendations, and personalized recommendation of users with similar visual and data preferences of interests.

To illustrate, for a user i, the GNN recommendation system 102 predicts the probability of a data-attribute j by using the learned representations of the user i denoted as $h_i$ and the attribute representation $h_j$ via a function g (such as MLP or a dot product):

$$\hat{y}_{ij} = g(h_i, h_j)$$

Using this formulation, the GNN recommendation system 102 obtains the probability of each attribute $j \in \mathcal{A}$ in the dataset of interest to a user i. From the resulting data attribute probabilities, the GNN recommendation system 102 obtains a personalized user-relevant ranking of data attributes for a user i. The GNN recommendation system 102 can determine similar rankings with regard to other users or particular visual configuration parameters.

Figure 9:
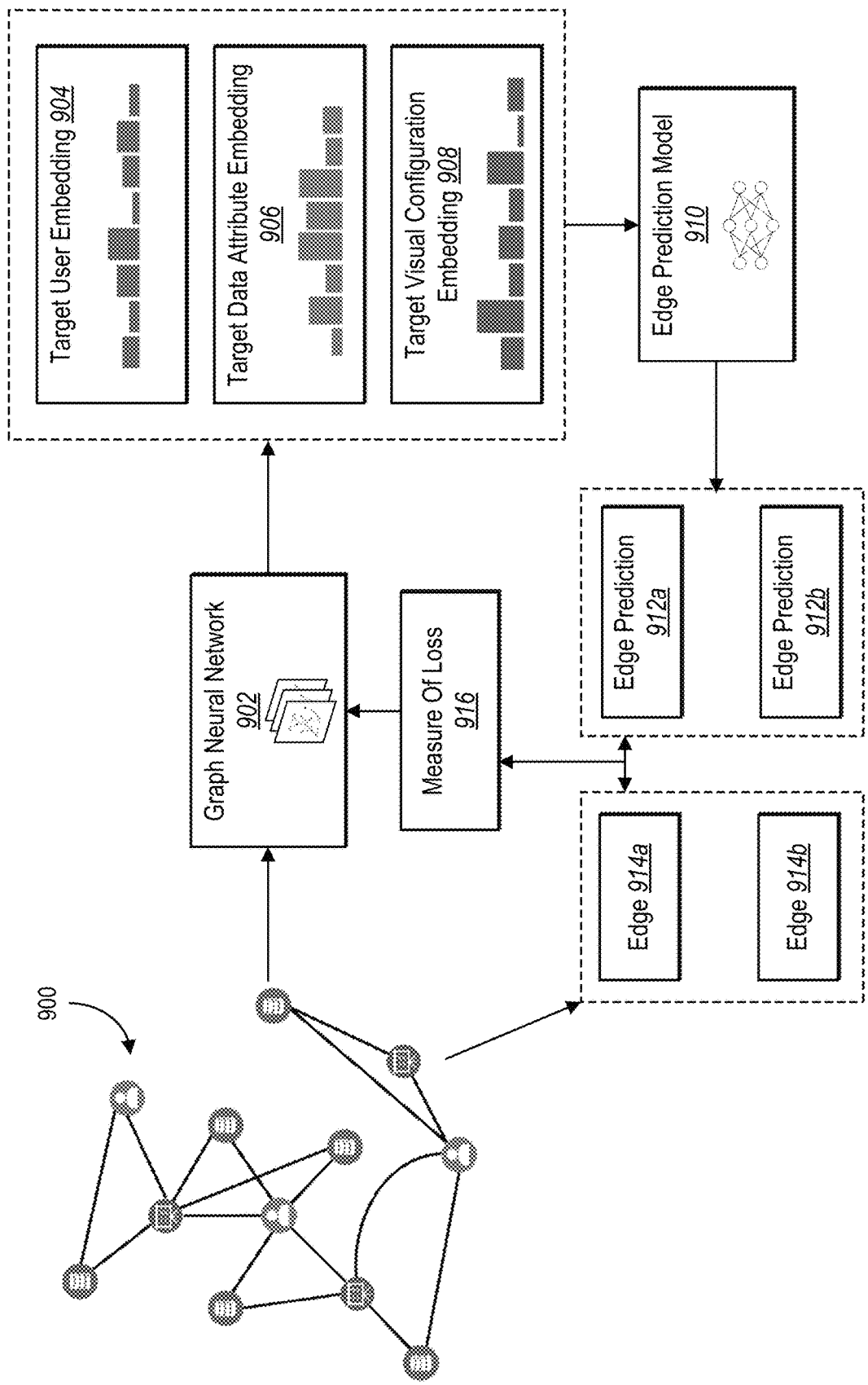
FIG. 9 illustrates a schematic diagram of training a graph neural network to generate recommendations in accordance with one or more embodiments.

As mentioned previously, in one or more embodiments, the GNN recommendation system 102 also trains a graph neural network (and one or more other neural networks, such as an edge prediction neural network or compatibility neural network). FIG. 9 illustrates training a graph neural network in accordance with one or more embodiments.

As shown in FIG. 9, the GNN recommendation system 102 generates a digital graph representation 900. Moreover, the GNN recommendation system 102 utilizes a graph neural network 902 to generate a target user embedding 904, a target data attribute embedding 906 and a target visual configuration embedding 908. The GNN recommendation system 102 utilizes an edge prediction model 910 to generate an edge prediction 912a and an edge prediction 912b. Specifically, the GNN recommendation system 102 utilizes the edge prediction model 910 to generate the edge prediction 912a from a first embedding pair (e.g., the target user embedding 904 and the target data attribute embedding 906). The GNN recommendation system 102 also utilizes the edge prediction model 910 to determine the edge prediction 912b from a second embedding pair (e.g., the target user embedding 904 and the target visual configuration embedding 908). The GNN recommendation system 102 compares the edge predictions 912a-912b with actual edges from the digital graph representation 900.

In particular, the GNN recommendation system 102 extracts an edge 914a between a user node corresponding to the target user and a data attribute node corresponding to the target data attribute. Similarly, the GNN recommendation system 102 extracts an edge 914b between the user node and a visual configuration node corresponding to the target set of visual configurations. The GNN recommendation system 102 compares the edges 914a-914b with the edge predictions 912a-912b. Moreover, the GNN recommendation system 102 then modifies learned parameters of the graph neural network 902 based on the comparison.

Specifically, in one or more embodiments the GNN recommendation system 102 utilizes a loss function to compare the edges 914a-914b and the edge predictions 912a-912b and determine a measure of loss 916. The GNN recommendation system 102 then utilizes the measure of loss 916 to modify the learned parameters of the graph neural network (e.g., utilizing backpropagation). The GNN recommendation system 102 can utilize a variety of loss functions. In one or more embodiments, the GNN recommendation system 102 uses the following binary cross-entropy loss:

$$\mathcal{L} = - \sum_{uv \in \mathcal{D}} (y_{uv} \log(\hat{y}_{uv}) + (1 - y_{uv}) \log(1 - \hat{y}_{uv}))$$

Although FIG. 9 illustrates a particular set of edge predictions, in one or more embodiments the GNN recommendation system 102 iteratively performs the process illustrated in FIG. 9 (e.g., with numerous edge predictions) to train the graph neural network. In this manner, the GNN recommendation system 102 trains the GNN recommendation system 102 to generate embeddings that are near in vector space for nodes that have strong edge connections within a corresponding graph.

In addition, although FIG. 9 illustrates updating parameters of the graph neural network 902, the GNN recommendation system 102 can also learn parameters of the edge prediction model 910 and/or a compatibility neural network. For example, the GNN recommendation system 102 can also utilize the measure of loss 916 to modify parameters of the edge prediction model 910.

Furthermore, in some embodiments, the GNN recommendation system 102 utilizes the compatibility neural network to generate an overall compatibility score. The GNN recommendation system 102 can compare the combined edges to the overall compatibility score with a ground truth compatibility score (e.g., a score derived from the digital graph representation 900, crowd sourcing, or historical interactions) to determine the measure of loss 916. Moreover, the GNN recommendation system 102 can modify parameters of the compatibility neural network to reduce the measure of loss.

Figure 10:
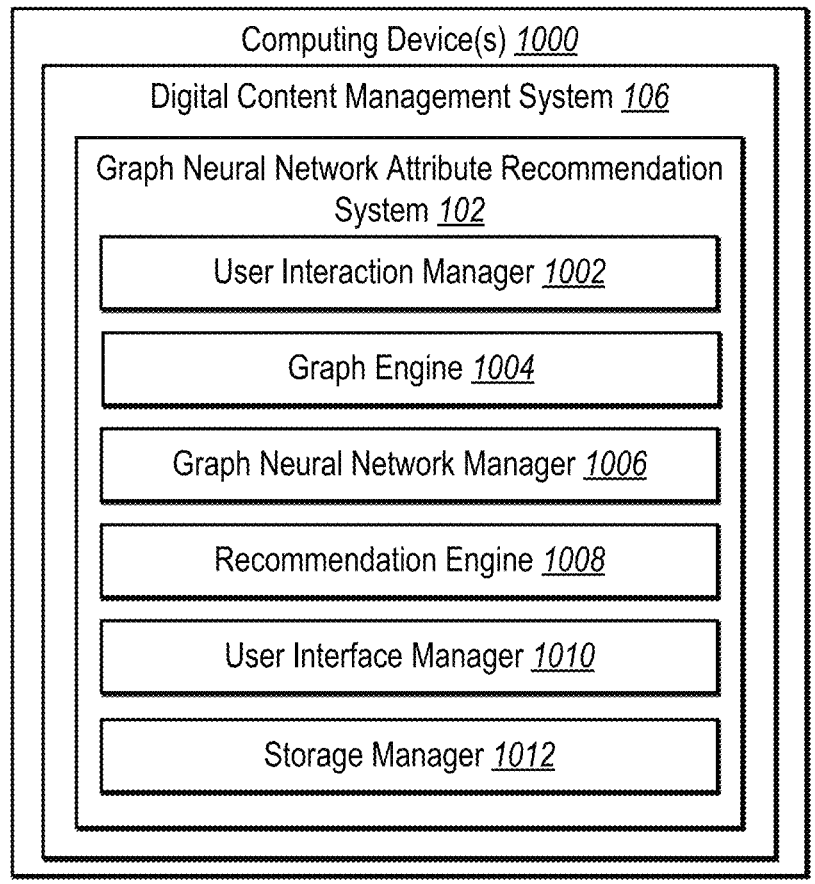
FIG. 10 illustrates a schematic diagram of a graph neural network attribute recommendation system in accordance with one or more embodiments.

Looking now to FIG. 10, additional detail will be provided regarding components and capabilities of the GNN recommendation system 102. Specifically, FIG. 10 illustrates an example schematic diagram of the GNN recommendation system 102 on an example computing device 1000 (e.g., one or more of the client device 112 and/or the server(s) 104). As shown in FIG. 10, the GNN recommendation system 102 includes a user interaction manager 1002, a graph engine 1004, a graph neural network manager 1006, a recommendation engine 1008, a user interface manager 1010, and a storage manager 1012.

As just mentioned, the GNN recommendation system 102 includes the user interaction manager 1002. The user interaction manager 1002 can identify, collect, monitor, and/or retrieve, user interactions via one or more client devices. For example, as discussed above, the user interaction manager 1002 can identify user interactions with datasets, data attributes, and/or data visualizations.

As shown in FIG. 10, the GNN recommendation system 102 also includes the graph engine 1004. The graph engine 1004 can create, generate, and utilize one or more digital graph representations. For example, as discussed above, the graph engine 1004 can generate a digital graph representation from historical interactions between users (client devices), data attributes, and/or data visualizations.

As further illustrated in FIG. 10, the GNN recommendation system 102 also includes the graph neural network manager 1006. The graph neural network manager 1006 can train, generate, apply, and/or utilize a graph neural network. For example, as discussed above, the graph neural network manager 1006 can generate/modify learned parameters of a graph neural network to train the graph neural network to generate user embeddings, data attribute embeddings, and/or visualization configuration embeddings. Moreover, the graph neural network manager 1006 can generate embeddings from a graph to assist in determining compatibility scores between users, data attributes, and/or data visualizations.

Moreover, as shown, the GNN recommendation system 102 can include the recommendation engine 1008. The recommendation engine 1008 can generate, determine, and/or provide one or more digital data recommendations. For example, the recommendation engine 1008 can generate and provide data attribute recommendations, data visualization recommendations, and/or user recommendations. In some embodiments, the recommendation engine 1008 determines compatibility scores and generates recommendations based on the compatibility scores.

The GNN recommendation system 102 can also include the user interface manager 1010. The user interface manager 1010 can manage one or more user interfaces. For example, the user interface manager 1010 can generate user interface elements portraying recommendations, data attributes, and/or data visualizations.

In addition, as illustrated in FIG. 10, the GNN recommendation system 102 can also include the storage manager 1012. The storage manager 1012 can include one or more memory devices for storing information related to the GNN recommendation system 102. For instance, the storage manager 1012 can store, recall, and/or maintain historical user interactions, graphs, graph neural networks, edge prediction models, compatibility neural networks, datasets, data attributes, data values, data visualizations, visualization configurations, and/or recommendations.

In one or more embodiments, each of the components of the GNN recommendation system 102 are in communication with one another using any suitable communication technologies. Additionally, the components of the GNN recommendation system 102 are in communication with one or more other devices including one or more client devices described above. It will be recognized that although the components of the GNN recommendation system 102 are shown to be separate in FIG. 10, any of the subcomponents may be combined into fewer components, such as into a single component, or divided into more components as may serve a particular implementation. Furthermore, although the components of FIG. 10 are described in connection with the GNN recommendation system 102, at least some of the components for performing operations in conjunction with the GNN recommendation system 102 described herein may be implemented on other devices within the environment.

The components of the GNN recommendation system 102 can include software, hardware, or both. For example, the components of the GNN recommendation system 102 can include one or more instructions stored on a computer-readable storage medium and executable by processors (or at least one processor) of one or more processing devices/computing devices (e.g., the computing device 1000). When executed by the one or more processors, the computer-executable instructions of the GNN recommendation system 102 can cause the computing device 1000 to perform the methods described herein. Alternatively, the components of the GNN recommendation system 102 can comprise hardware, such as a special purpose processing device to perform a certain function or group of functions. Additionally, or alternatively, the components of the GNN recommendation system 102 can include a combination of computer-executable instructions and hardware.

Furthermore, the components of the GNN recommendation system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the GNN recommendation system 102 may be implemented as part of a stand-alone application on a personal computing device or a mobile device. Alternatively, or additionally, the components of the GNN recommendation system 102 may be implemented in any application for displaying, modifying, or identifying digital content, including, but not limited to ADOBE AUDIENCE MANAGER, ADOBE DATA PLATFORM, ADOBE EXPERIENCE PLATFORM, ADOBE CAMPAIGN, ADOBE ANALYTICS, ADOBE TARGET, MAGENTO, ADOBE DOCUMENT CLOUD, and/or ADOBE MARKETING CLOUD/EXPERIENCE CLOUD. The foregoing are either registered trademarks or trademarks of Adobe Inc. in the United States and/or other countries.

FIGS. 1-10 the corresponding text, and the examples provide a number of different systems, methods, and non-transitory computer readable media for generating enhanced digital images from burst digital images. In addition to the foregoing, embodiments can also be described in terms of flowcharts comprising acts for accomplishing a particular result. For example, FIG. 11 illustrates a flowchart of an example sequence or series of acts for generating a data recommendation utilizing a graph neural network in accordance with one or more embodiments.

Figure 11:
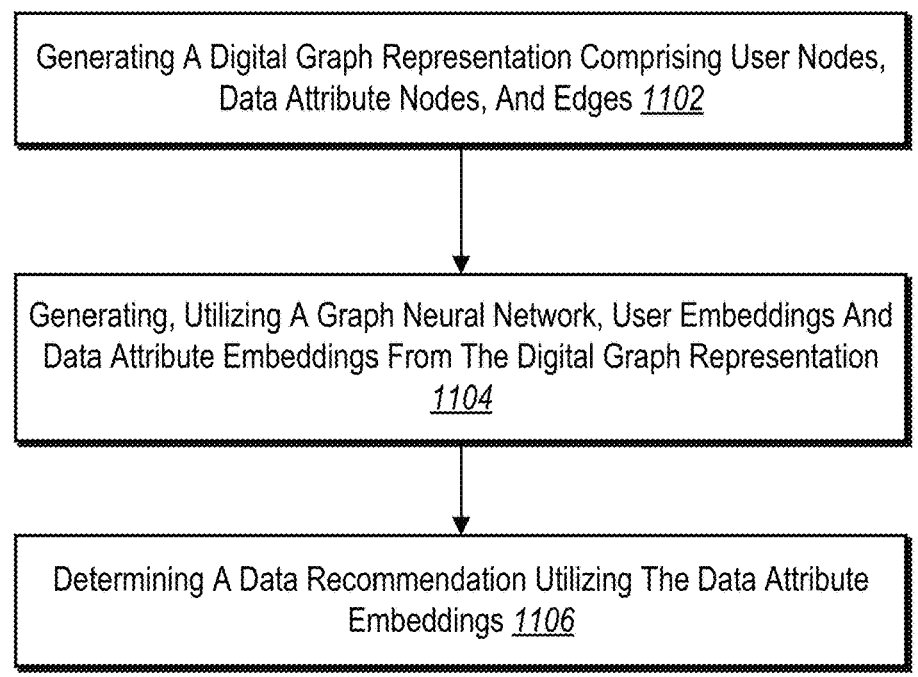
FIG. 11 illustrates a flowchart of a series of acts for generating a data attribute recommendation utilizing a graph neural network in accordance with one or more embodiments.

While FIG. 11 illustrates specific acts according to particular embodiments, alternative embodiments may omit, add to, reorder, and/or modify any of the acts shown in FIG. 11. The acts of FIG. 11 can be performed as part of a method. Alternatively, a non-transitory computer readable medium can comprise instructions, that when executed by one or more processors, cause a computing device to perform the acts of FIG. 11. In still further embodiments, a system can perform the acts of FIG. 11. Additionally, the acts described herein may be repeated or performed in parallel with one another or in parallel with different instances of the same or other similar acts.

FIG. 11 illustrates an example series of acts 1100 that includes an act 1102 of generating a digital graph representation comprising user nodes, data attribute nodes, and edges. For example, in one or more implementations the act 1102 includes generating a digital graph representation comprising user nodes corresponding to users, data attribute nodes corresponding to data attributes, and edges reflecting historical interactions between the users and the data attributes. To illustrate, in some implementations the act 1102 includes determining the historical interactions by monitoring client device interactions of the users with data visualizations comprising one or more of the data attributes and having visual configuration parameters; and generating the digital graph representation by generating the user nodes, the data attribute nodes, and visual configuration nodes corresponding to the visual configuration parameters, wherein the edges reflect historical interactions between the users and the data visualizations.

In one or more implementations the act 1102 includes generating the graph representation comprises: generating the user nodes, the data attribute nodes, and visual configuration nodes corresponding to visual configuration parameters of data visualizations comprising one or more of the data attributes. Moreover, in some implementations the act 1102 includes generating the graph representation comprises generating the edges based on historical interactions between the users and the data visualizations.

In addition, as shown in FIG. 11 the series of acts 1100 includes an act 1104 of generating, utilizing a graph neural network, user embeddings and data attribute embeddings from the digital graph representation. For example, in one or more implementations the act 1104 includes generating, utilizing a graph neural network, user embeddings for the user nodes and data attribute embeddings for the data attribute nodes from the digital graph representation. To illustrate, in some implementations generating the user embeddings and the data attribute embeddings comprises, for a first node: determining neighborhood nodes corresponding to the first node within the digital graph representation; generating an aggregated neighbor embedding by combining embeddings corresponding to the neighborhood nodes utilizing an aggregator model; and generating an embedding for the first node utilizing learned parameters of the graph neural network from the aggregated neighbor embedding.

In one or more implementations, the act 1104 includes generating, utilizing the graph neural network, the user embeddings, the data attribute embeddings, and visual configuration embeddings from the digital graph representation.

Moreover, in some implementations, the act 1104 includes generating visual configuration embeddings utilizing the graph neural network from the graph representation comprising the user nodes, the data attribute nodes, the visual configuration nodes, and the edges.

Moreover, FIG. 11 shows that the series of acts 1100 also includes an act 1106 of determining a data recommendation utilizing the data attribute embeddings. For example, in one or more implementations the act 1106 includes determining a data recommendation for a target user utilizing the data attribute embeddings and a target user embedding corresponding to the target user from the user embeddings. To illustrate, in one or more implementations the act 1106 includes identifying a target data visualization comprising a set of target data attributes and target visual configuration parameters; and generating the data recommendation comprises generating a data visual recommendation comprising the target data visualization.

In some implementations, the act 1106 includes determining a data attribute recommendation. For example, the act 1106 includes determining a target data attribute for the target user and a target data attribute embedding from the data attribute embeddings; combining the target data attribute embedding and the target user embedding to determine a compatibility score; and generating the data attribute recommendation utilizing the compatibility score. Moreover, in one or more implementations the act 1106 also includes determining, for an additional target data attribute, an additional target data attribute embedding from the data attribute embeddings; generating a first edge score by combining the target data attribute embedding and the target user embedding; generating a second edge score by combining the target data attribute embedding and the target user embedding; and determining the compatibility score from the first edge score and the second edge score. Moreover, in some implementations combining the target data attribute embedding and the target user embedding comprises utilizing a compatibility neural network to generate a predicted compatibility score from the target data attribute embedding and the target user embedding.

In one or more implementations, the act 1106 includes generating a compatibility score utilizing a compatibility neural network from the target user embedding and the target data attribute embedding; and generating the data recommendation based on the compatibility score.

Moreover, in one or more implementations, generating the data recommendation comprises generating a digital visualization recommendation by: determining, for the target user, a target visualization comprising a target data attribute and a set of target visualization parameters; and determining a target visualization configuration embedding for the set of target visualization parameters from the visual configuration embeddings and a target data attribute embedding for the target data attribute from the data attribute embeddings.

In some implementations, generating the digital visualization recommendation comprises: generating a compatibility score between the target user and the target visualization from the target user embedding, the target data attribute embedding, and the target visualization parameter embedding; and generating the digital visualization recommendation corresponding to the target visualization for the target user based on the compatibility score.

Figure 12:
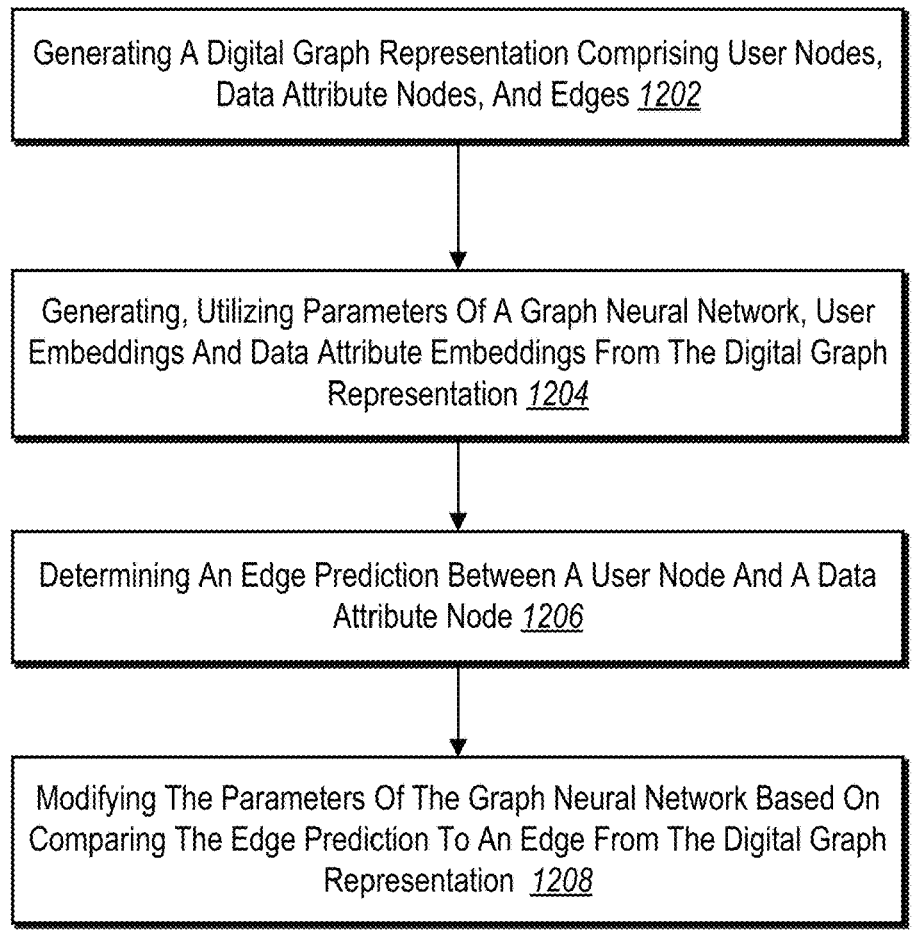
FIG. 12 illustrates a flowchart of a series of acts for training a graph neural network to generate predicted data attributes in accordance with one or more embodiments.

In addition, FIG. 12 illustrates a flowchart of an example sequence or series of acts for training a graph neural network to generate predicted data attributes in accordance with one or more embodiments.

While FIG. 12 illustrates specific acts according to particular embodiments, alternative embodiments may omit, add to, reorder, and/or modify any of the acts shown in FIG. 12. The acts of FIG. 12 can be performed as part of a method. Alternatively, a non-transitory computer readable medium can comprise instructions, that when executed by one or more processors, cause a computing device to perform the acts of FIG. 12. In still further embodiments, a system can perform the acts of FIG. 12. Additionally, the acts described herein may be repeated or performed in parallel with one another or in parallel with different instances of the same or other similar acts.

FIG. 12 illustrates an example series of acts 1200 that includes an act 1202 of generating a digital graph representation comprising user nodes, data attribute nodes, and edges. For example, in one or more embodiments the act 1202 includes generating, by at least one processing device, a digital graph representation comprising user nodes corresponding to users, data attribute nodes corresponding to data attributes, and edges reflecting historical interactions between the users and the data attributes.

In addition, as shown in FIG. 12 the series of acts 1200 includes an act 1204 of generating, utilizing parameters of a graph neural network, user embeddings and data attribute embeddings from the digital graph representation. For example, in one or more embodiments the act 1204 includes generating, utilizing parameters of a graph neural network, user embeddings for the user nodes and data attribute embeddings for the data attribute nodes from the digital graph representation. To illustrate, in some embodiments the act 1204 includes generating node embeddings for nodes of the digital graph representation using the graph neural network; determining neighborhood nodes corresponding to the user node within the digital graph representation; generating an aggregated neighbor embedding by combining embeddings of the node embeddings corresponding to the neighborhood nodes utilizing an aggregator model; and generating, utilizing the parameters of the graph neural network, the user embedding for the user node from the aggregated neighbor embedding. In some implementations, generating the aggregated neighbor embedding comprises utilizing at least one of an LSTM aggregator model or a mean aggregator model to generate the aggregated neighbor embedding.

Moreover, FIG. 12 shows that the series of acts 1200 also includes an act 1206 of determining an edge prediction between a user node and a data attribute node. For example, in one or more implementations the act 1206 includes determining an edge prediction between a user node and a data attribute node utilizing a user embedding of the user embeddings corresponding to the user node and a data attribute embedding of the data attribute embeddings corresponding to the data attribute node. To illustrate, in some implementations the act 1206 includes determining the edge prediction by utilizing a neural network to generate the edge prediction from the user embedding and the data attribute embedding.

Furthermore, as illustrated in FIG. 12, the series of acts 1200 includes an act 1208 of modifying the parameters of the graph neural network based on comparing the edge prediction to an edge from the digital graph representation. For example, in one or more embodiments the act 1208 includes modifying, by the at least one processing device, the parameters of the graph neural network based on comparing the edge prediction to an edge between the user node and the data attribute node from the digital graph representation. To illustrate, in some implementations, comparing the edge prediction to the edge comprises utilizing a loss function to determine a measure of loss between the edge prediction and the edge.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 13:
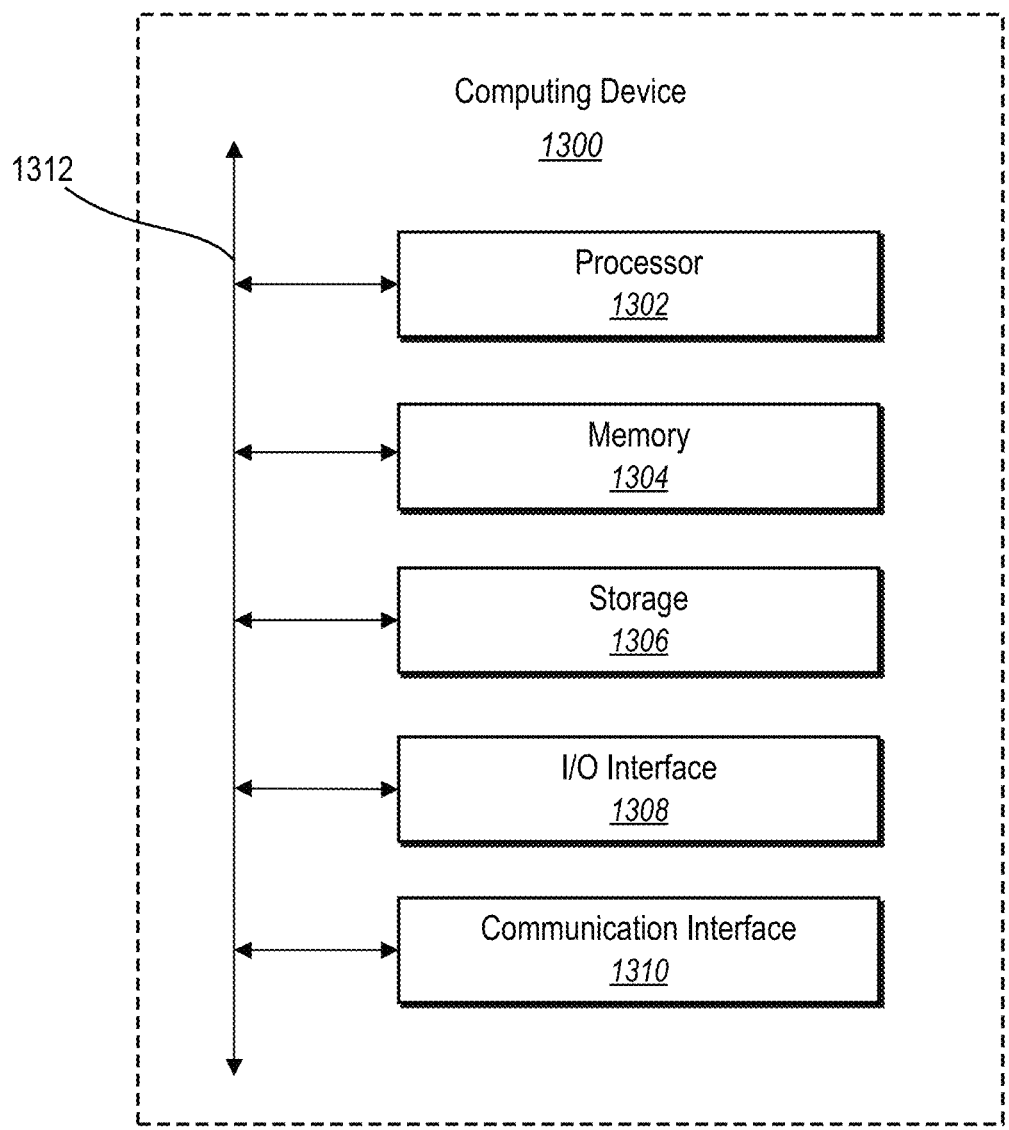
FIG. 13 illustrates a block diagram of an example computing device/processing device in accordance with one or more embodiments.

FIG. 13 illustrates, in block diagram form, an example computing device 1300 (e.g., the computing device 1000, the client device 112, and/or the server(s) 104) that may be configured to perform one or more of the processes described above. One will appreciate that the GNN recommendation system 102 can comprise implementations of the computing device 1300. As shown by FIG. 13, the computing device can comprise a processor 1302, memory 1304, a storage device 1306, an I/O interface 1308, and a communication interface 1310. Furthermore, the computing device 1300 can include an input device such as a touchscreen, mouse, keyboard, etc. In certain embodiments, the computing device 1300 can include fewer or more components than those shown in FIG. 13. Components of computing device 1300 shown in FIG. 13 will now be described in additional detail.

In particular embodiments, processor(s) 1302 includes hardware for executing instructions, such as those making up a computer program. As an example, and not by way of limitation, to execute instructions, processor(s) 1302 may retrieve (or fetch) the instructions from an internal register, an internal cache, memory 1304, or a storage device 1306 and decode and execute them.

The computing device 1300 includes memory 1304, which is coupled to the processor(s) 1302. The memory 1304 may be used for storing data, metadata, and programs for execution by the processor(s). The memory 1304 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1304 may be internal or distributed memory.

The computing device 1300 includes a storage device 1306 includes storage for storing data or instructions. As an example, and not by way of limitation, storage device 1306 can comprise a non-transitory storage medium described above. The storage device 1306 may include a hard disk drive (HDD), flash memory, a Universal Serial Bus (USB) drive or a combination of these or other storage devices.

The computing device 1300 also includes one or more input or output ("I/O") devices/interfaces 1308, which are provided to allow a user to provide input to (such as user strokes), receive output from, and otherwise transfer data to and from the computing device 1300. These I/O devices/interfaces 1308 may include a mouse, keypad or a keyboard, a touch screen, camera, optical scanner, network interface, modem, other known I/O devices or a combination of such I/O devices/interfaces 1308. The touch screen may be activated with a writing device or a finger.

The I/O devices/interfaces 1308 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1308 is configured to provide graphical data to a display for presentation to a user. The graphical data may be representative of one or more graphical user interfaces and/or any other graphical content as may serve a particular implementation.

The computing device 1300 can further include a communication interface 1310. The communication interface 1310 can include hardware, software, or both. The communication interface 1310 can provide one or more interfaces for communication (such as, for example, packet-based communication) between the computing device and one or more other computing devices 1300 or one or more networks. As an example, and not by way of limitation, communication interface 1310 may include a network interface controller (NIC) or network adapter for communicating with an Ethernet or other wire-based network or a wireless NIC (WNIC) or wireless adapter for communicating with a wireless network, such as a WI-FI. The computing device 1300 can further include a bus 1312. The bus 1312 can comprise hardware, software, or both that couples components of computing device 1300 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer readable medium comprising instructions that, when executed by a processing device, cause the processing device to perform operations comprising:

generating, from one or more data sets associated with users, a data attribute graph from data attributes utilized by the users, a visual configuration parameters graph from visual configuration parameters of data visualizations portraying the data attributes, and a combined data attribute visual configuration parameters graph from the data attributes and the visual configuration parameters;

generating, based on the data attribute graph, the visual configuration parameters graph, and the combined data attribute visual configuration parameters graph, a digital graph representation by:
- generating visual configuration nodes reflecting the visual configuration parameters of the data visualizations,
- generating user nodes corresponding to the users,
- generating data attribute nodes corresponding to the data attributes, and
- generating edges connecting the visual configuration nodes, the user nodes, and the data attribute nodes within the digital graph representation, wherein the edges reflect historical interactions between the users, the data attributes, and the visual configuration parameters of the data visualizations;

generating, utilizing a graph neural network, user embeddings for the user nodes, data attribute embeddings for the data attribute nodes, and visual configuration embeddings for the visual configuration parameters from the digital graph representation; and determining a data recommendation comprising:
- a target data attribute for a target user utilizing the data attribute embeddings and a target user embedding corresponding to the target user from the user embeddings, or
- a target data visualization comprising a set of target visual configuration parameters for the target user utilizing the visual configuration embeddings and the target user embedding corresponding to the target user.

2. The non-transitory computer readable medium of claim 1, wherein generating the user embeddings and the data attribute embeddings comprises, for a first node:
- determining neighborhood nodes corresponding to the first node within the digital graph representation;
- generating an aggregated neighbor embedding by combining embeddings corresponding to the neighborhood nodes utilizing an aggregator model; and
- generating an embedding for the first node utilizing learned parameters of the graph neural network from the aggregated neighbor embedding.

3. The non-transitory computer readable medium of claim 1, further comprising instructions that, when executed by the processing device, cause the processing device to perform operations comprising:
- determining the historical interactions by monitoring client device interactions of the users with the data visualizations, wherein the data visualizations comprise one or more of the data attributes and have one or more of the visual configuration parameters.

4. The non-transitory computer readable medium of claim 1, further comprising instructions that, when executed by the processing device, cause the processing device to perform operations comprising identifying a target data visualization comprising a set of target data attributes and target visual configuration parameters.

5. The non-transitory computer readable medium of claim 4, further comprising instructions that, when executed by the processing device, cause the processing device to perform operations comprising:
- generating the data recommendation comprises generating a data visual recommendation comprising the target data visualization.

6. The non-transitory computer readable medium of claim 1, wherein generating the data recommendation comprises generating a data attribute recommendation by:
- determining a target data attribute for the target user and a target data attribute embedding from the data attribute embeddings;
- combining the target data attribute embedding and the target user embedding to determine a compatibility score; and
- generating the data attribute recommendation utilizing the compatibility score.

7. The non-transitory computer readable medium of claim 6, wherein generating the data attribute recommendation comprises:
- determining, for an additional target data attribute, an additional target data attribute embedding from the data attribute embeddings;
- generating a first edge score by combining the target data attribute embedding and the target user embedding;
- generating a second edge score by combining the target data attribute embedding and the target user embedding; and
- determining the compatibility score from the first edge score and the second edge score.

8. The non-transitory computer readable medium of claim 1, wherein the data attribute graph represents data attributes in the one or more data sets, the visual configuration parameters graph represent visual configuration parameters of data visualizations, and the combined data attribute visual configuration parameters graph represents one or more attributes used with specific visual configuration parameters.

9. A system comprising:
- one or more memory devices; and
- one or more processing devices coupled to the one or more memory devices, the one or more processing devices configured to perform operations comprising:
  - generating, from one or more data sets associated with users, a data attribute graph from data attributes utilized by the users, a visual configuration parameters graph from visual configuration parameters of data visualizations portraying the data attributes, and a combined data attribute visual configuration parameters graph from the data attributes and the visual configuration parameters;
  - generating, based on the data attribute graph, the visual configuration parameters graph, and the combined data attribute visual configuration parameters graph, a digital graph representation by:
    - generating visual configuration nodes reflecting the visual configuration parameters of the data visualizations,
    - generating user nodes corresponding to the users,
    - generating data attribute nodes corresponding to the data attributes, and
    - generating edges connecting the visual configuration nodes, the user nodes, and the data attribute nodes within the digital graph representation, wherein the edges reflect historical interactions between the users, the data attributes, and the visual configuration parameters of the data visualizations;
  - generating, utilizing a graph neural network, user embeddings for the user nodes, data attribute embeddings for the data attribute nodes, and visual configuration embeddings for the visual configuration parameters from the digital graph representation; and
  - determining a data recommendation comprising:

a target data attribute for a target user utilizing the data attribute embeddings and a target user embedding corresponding to the target user from the user embeddings, or a target data visualization comprising a set of target visual configuration parameters for the target user utilizing the visual configuration embeddings and the target user embedding corresponding to the target user.

10. The system of claim 9, wherein the one or more processing devices are further configured to perform operations comprising:

generating a compatibility score utilizing a compatibility neural network from the target user embedding and a target data attribute embedding; and generating the data recommendation based on the compatibility score.

11. The system of claim 9, wherein the one or more processing devices are further configured to perform operations comprising:

determining a target data attribute for the target user and a target data attribute embedding from the data attribute embeddings;

combining the target data attribute embedding and the target user embedding to determine a compatibility score; and generating the data recommendation utilizing the compatibility score.

12. The system of claim 11, wherein the one or more processing devices are further configured to perform operations comprising:

determining, for an additional target data attribute, an additional target data attribute embedding from the data attribute embeddings;

generating a first edge score by combining the target data attribute embedding and the target user embedding;

generating a second edge score by combining the target data attribute embedding and the target user embedding; and determining the compatibility score from the first edge score and the second edge score.

13. The system of claim 12, wherein the one or more processing devices are further configured to perform operations comprising generating visual configuration embeddings utilizing the graph neural network from the digital graph representation comprising the user nodes, the data attribute nodes, the visual configuration nodes, and the edges.

14. The system of claim 9, wherein generating the data recommendation comprises generating a digital visualization recommendation by:

determining, for the target user, the target data visualization comprising a target data attribute and the set of target visual configuration parameters; and determining a target data visualization configuration embedding for the set of target visual configuration parameters from the visual configuration embeddings and a target data attribute embedding for the target data attribute from the data attribute embeddings.

15. The system of claim 14, wherein generating the digital visualization recommendation comprises:

generating a compatibility score between the target user and the target data visualization from the target user embedding, the target data attribute embedding, and the target data visualization configuration embedding; and generating the digital visualization recommendation corresponding to the target data visualization for the target user based on the compatibility score.

16. A method comprising:

generating, from one or more data sets associated with users, a data attribute graph from data attributes utilized by the users, a visual configuration parameters graph from visual configuration parameters of data visualizations portraying the data attributes, and a combined data attribute visual configuration parameters graph from the data attributes and the visual configuration parameters;

receiving, based on the data attribute graph, the visual configuration parameters graph, and the combined data attribute visual configuration parameters graph, a digital graph representation comprising:

visual configuration nodes reflecting the visual configuration parameters of the data visualizations, user nodes corresponding to the users, data attribute nodes corresponding to the data attributes, and edges reflecting historical interactions between the users, the data attributes, and the visual configuration parameters of the data visualizations; and training a graph neural network using the digital graph representation to generate a trained graph neural network that generates user embeddings, data attribute embeddings, and visual configuration embeddings for identifying digital recommendations by:

generating a first edge prediction for a user node and a data attribute node and a second edge prediction for the user node and a visual configuration node utilizing parameters of the graph neural network; and modifying the parameters of the graph neural network based on comparing the first edge prediction to a first edge between the user node and the data attribute node from the digital graph representation and comparing the second edge prediction to a second edge between the user node and the visual configuration node from the digital graph representation.

17. The method of claim 16, wherein generating the first edge prediction further comprises:

generating, utilizing the parameters of the graph neural network, a user embedding for the user node and a data attribute embedding for the data attribute node from the digital graph representation; and determining the first edge prediction between the user node and the data attribute node utilizing the user embedding and the data attribute embedding.

18. The method of claim 17, further comprising determining the first edge prediction by utilizing a neural network to generate the first edge prediction from the user embedding and the data attribute embedding.

19. The method of claim 16, wherein training the graph neural network further comprises:

generating node embeddings for nodes of the digital graph representation using the graph neural network;

determining neighborhood nodes corresponding to the user node within the digital graph representation;

generating an aggregated neighbor embedding by combining embeddings of the node embeddings corresponding to the neighborhood nodes utilizing an aggregator model; and generating, utilizing the parameters of the graph neural network, a user embedding for the user node from the aggregated neighbor embedding.

20. The method of claim 19, wherein generating the aggregated neighbor embedding comprises utilizing at least one of an Long Short-Term Memory aggregator model or a mean aggregator model to generate the aggregated neighbor embedding.

* * * * *